(12) United States Patent
Huang et al.

(10) Patent No.: US 12,192,396 B2
(45) Date of Patent: Jan. 7, 2025

(54) CALL DISPLAY METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventors: Jianshu Huang, Shenzhen (CN); Wen Zha, Shenzhen (CN); Hongfa Qiu, Shenzhen (CN); Lin Zhang, Shenzhen (CN); Yi Luo, Shenzhen (CN); Junjie Zhou, Shenzhen (CN); Weijie Li, Shenzhen (CN); Sanhua Zhang, Shenzhen (CN); Yanhua Xuan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/326,592

(22) Filed: May 31, 2023

(65) Prior Publication Data
US 2023/0328166 A1     Oct. 12, 2023

Related U.S. Application Data

(63) Continuation of application No. PCT/CN2022/114764, filed on Aug. 25, 2022.

(30) Foreign Application Priority Data

Sep. 23, 2021  (CN) .......................... 202111115224.3

(51) Int. Cl.
| | |
|---|---|
| *H04M 1/72448* | (2021.01) |
| *H04M 1/72403* | (2021.01) |
| *G06F 3/16* | (2006.01) |

(52) U.S. Cl.
CPC ... *H04M 1/72403* (2021.01); *H04M 1/72448* (2021.01); *G06F 3/165* (2013.01)

(58) Field of Classification Search
None
See application file for complete search history.

(56) References Cited

U.S. PATENT DOCUMENTS 8,958,537 B1 * 2/2015 Saylor ............... H04M 3/42068
                                          455/425
9,083,790 B1 * 7/2015 Owens ................ H04M 7/0033
(Continued)

FOREIGN PATENT DOCUMENTS

| CN | 103957313 A | 7/2014 |
| CN | 105208089 A | 12/2015 |

(Continued)

OTHER PUBLICATIONS

Shu et al., "Talk2Me: A Framework for Device-to-Device Augmented Reality Social Network" 2018 IEEE International Conference on Pervasive Computing and Communications (PerCom), copyright 2018 IEEE, pp. 1-10. (Year: 2018).*

(Continued)

*Primary Examiner* — Amelia L Tapp
(74) *Attorney, Agent, or Firm* — ANOVA LAW GROUP, PLLC

(57) ABSTRACT

This application discloses a call display method and apparatus, a device, and a storage medium, which fall within the field of instant messaging. The method includes displaying an outgoing call-interface, the outgoing call-interface being prior to a call connection between the first terminal and a second terminal; and displaying recent information in the outgoing call-interface, the recent information being social network information recently posted by a second user account corresponding to the second terminal.

19 Claims, 17 Drawing Sheets

(56) References Cited

U.S. PATENT DOCUMENTS

| | | | |
|---|---|---|---|
| 10,255,327 B2* | 4/2019 | Kuramura | G06F 16/24578 |
| 2010/0304729 A1 | 12/2010 | Sabotta et al. | |
| 2012/0196581 A1* | 8/2012 | Papakipos | H04W 4/16 |
| | | | 455/415 |
| 2020/0053214 A1* | 2/2020 | Kats | H04M 1/576 |

FOREIGN PATENT DOCUMENTS

| | | | |
|---|---|---|---|
| CN | 107623772 A | 1/2018 | |
| CN | 107911549 A | 4/2018 | |
| CN | 110225178 A | 9/2019 | |
| CN | 110971749 A | 4/2020 | |

OTHER PUBLICATIONS

The World Intellectual Property Organization (WIPO) International Search Report for PCT/CN2022/114764 Nov. 25, 2022 7 Pages (including translation).

* cited by examiner

CALL DISPLAY METHOD AND APPARATUS, DEVICE, AND STORAGE MEDIUM

RELATED APPLICATIONS

This application is a continuation of PCT Application No. PCT/CN2022/114764, filed on Aug. 25, 2022, which claims priority to Chinese Patent Application No. 202111115224.3, entitled "CALL DISPLAY METHOD AND APPARATUS, DEVICE, AND STORAGE MEDIUM" filed on Sep. 23, 2021. The two applications are incorporated by reference in their entirety.

FIELD OF THE TECHNOLOGY

This application relates to the field of instant messaging, and in particular, to a call display method and apparatus, a device, and a storage medium.

BACKGROUND OF THE DISCLOSURE

With the function of a voice call or a video call provided by an instant messaging program, instant messaging can be efficiently performed between users.

When a first user needs to start a voice call or a video call with a second user, a call invitation needs to be transmitted to the second user in the instant messaging program. At this moment, the instant messaging program may display a outgoing call-interface until the second user accepts the invitation. There is often a time difference between the first user initiating a call and the second user connecting the call. In this period, the first user may stay on the outgoing call-interface, and the first user can also zoom out the outgoing call-interface, to access information in other user interfaces (UIs) of the instant messaging program.

Often the first user needs to perform an operation of zooming out the outgoing call-interface and an operation of switching to display different UIs in the instant messaging program, to access other information access. In this process, the user operation is cumbersome.

SUMMARY

This application provides a call display method and apparatus, a device, and a storage medium. The technical solutions are as follows.

One aspect of this application provides a call display method. The method includes displaying an outgoing call-interface, the outgoing call-interface being prior to a call connection between the first terminal and a second terminal; and displaying recent information in the outgoing call-interface, the recent information being social network information recently posted by a second user account corresponding to the second terminal.

Another aspect of this application provides a computer device. The computer device includes a processor and a memory. The memory stores at least one instruction, at least one program, a code set, or an instruction set. At least one instruction, at least one program, the code set, or the instruction set is loaded and executed by the processor to implement the call display method as described above.

According to another aspect of this application, a non-transitory computer-readable storage medium is provided. The readable storage medium stores at least one instruction, at least one program, a code set, or an instruction set. At least one instruction, at least one program, the code set, or the instruction set is loaded and executed by a processor to implement the call display method as described above.

In embodiments of the present application, recent information of a second user account corresponding to a second terminal is displayed on an outgoing call-interface prior to a call connection between a first terminal and the second terminal. The first terminal directly displays information which may be accessed on the outgoing call-interface without receiving any user operation, thereby simplifying an operation of information access, and improving the human-computer interaction efficiency of information access.

The accompanying drawings, which are incorporated in and constitute a part of this specification, illustrate embodiments consistent with this application and, together with the specification, serve to explain the principles of this application.

DESCRIPTION OF EMBODIMENTS

Figure 1:
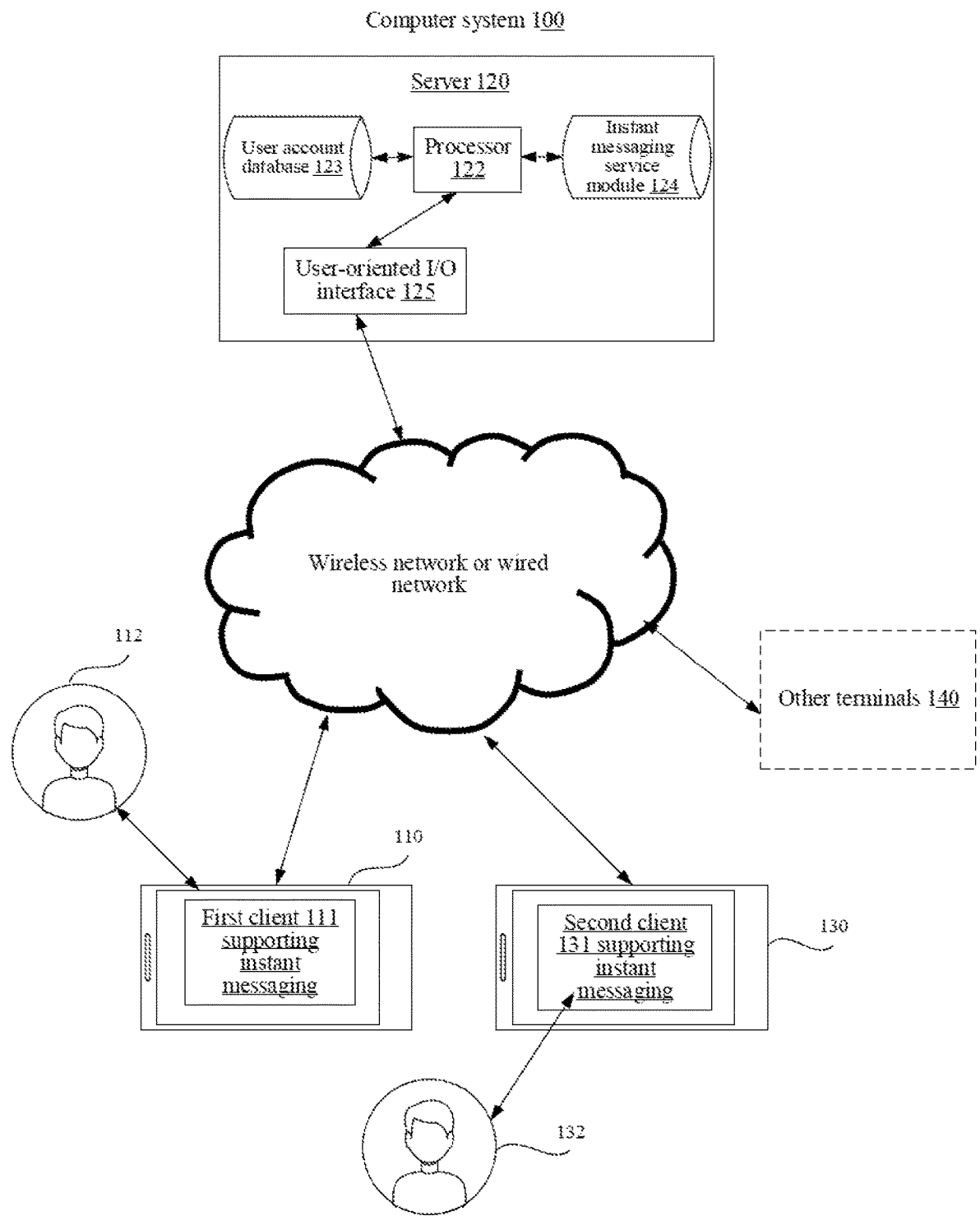
FIG. 1 is a structural block diagram of a computer system according to one embodiment of this application.

FIG. 1 is a structural block diagram of a computer system according to one embodiment of this application. Computer system 100 includes: a first terminal 110, a server 120, and a second terminal 130.

The first client 111 supporting instant messaging is installed and run in the first terminal 110, and the first client 111 may be an application having an instant messaging function or a web client. When the first terminal 110 runs the first client 111, a UI of the first client 111 is displayed on a screen of the first terminal 110. The application may be any one of an instant messaging program, a Weibo program, a voice call program, a conference program, a network community program, a payment program, a shopping program, a friend-making program, or a match-making program. In this embodiment, the application is exemplified by being an instant messaging program. The first terminal 110 is a terminal used by a first user 112, and a first user account of the first user 112 logs in the first client 111.

A second client 131 supporting instant messaging is installed and run in the second terminal 130, and the second client 131 may be an application having an instant messaging function or a web client. When the second terminal 130 runs the second client 131, a UI of the second client 131 is displayed on a screen of the second terminal 130. The application may be any one of an instant messaging program, a Weibo program, a voice call program, a conference program, a network community program, a payment program, a shopping program, a friend-making program, or a match-making program. In this embodiment, the application is exemplified by being an instant messaging program. The second terminal 130 is a terminal used by a second user 132, and a second user account of the second user 132 logs in the second client 131.

In some embodiments, the first user account of the first user 112 and the second user account of the second user 132 may belong to the same camp, the same team, the same organization, the same hall, or the same channel, and have a friend relationship or temporary communication permissions. In some embodiments, the first user account of the first user 112 and the second user account of the second user 132 may belong to different camps, different teams, different organizations, different halls, or different channels, or have an adversarial relationship.

In some embodiments, the applications installed on the first terminal 110 and the second terminal 130 are the same, or the applications installed on the two terminals are the same type of applications on different operating system platforms (Android or IOS). The first terminal 110 may refer to one of a plurality of terminals, and the second terminal 130 may refer to another of the plurality of terminals. This embodiment is exemplified only by the first terminal 110 and the second terminal 130. The first terminal 110 and the second terminal 130 have the same or different device types. The device types include at least one of a smartphone, a tablet computer, an e-book reader, an MP3 player, an MP4 player, a laptop portable computer, and a desktop computer.

Only two terminals are shown in FIG. 1. However, in different embodiments, there are multiple other terminals 140 having access to the server 120. In some embodiments, there are also one or more terminals 140 corresponding to a developer. A development and editing platform for a client supporting instant messaging is installed on terminal 140. The developer may edit and update the client on terminal 140, and transmit an updated application installation package to the server 120 through a wired or wireless network. The first terminal 110 and the second terminal 130 may download the application installation package from server 120 to implement the update of the client.

The first terminal 110, the second terminal 130, and the other terminals 140 are connected to server 120 through the wireless network or the wired network.

The server 120 includes at least one of a server, multiple servers, a cloud computing platform, and a virtualization center. The server 120 is configured to provide a background service for the client supporting instant messaging. In some embodiments, the server 120 undertakes primary computing tasks, and the terminal undertakes secondary computing tasks. Or the server 120 undertakes secondary computing tasks, and the terminal undertakes primary computing tasks. Or the server 120 and the terminal perform cooperative computing using a distributed computing architecture.

In a schematic example, the server 120 includes a processor 122, a user account database 123, an instant messaging service module 124, and a user-oriented input/output (I/O) interface 125. The processor 122 is configured to load an instruction stored in server 121 and process data in the user account database 123 and the instant messaging service module 124. The user account database 123 is configured to store data of user accounts used by the first terminal 110, the second terminal 130, and the other terminals 140, such as avatars of the user accounts, nicknames of the user accounts, and groups where the user accounts are located. The instant messaging service module 124 is configured to provide multiple chat rooms (for two-person chat or multi-person chat) for users to perform instant messaging chats, post emotions, transmit red packets and the like. The user-oriented I/O interface 125 is configured to communicate data with the first terminal 110 and/or the second terminal 130 through the wireless network or the wired network.

Figure 2:
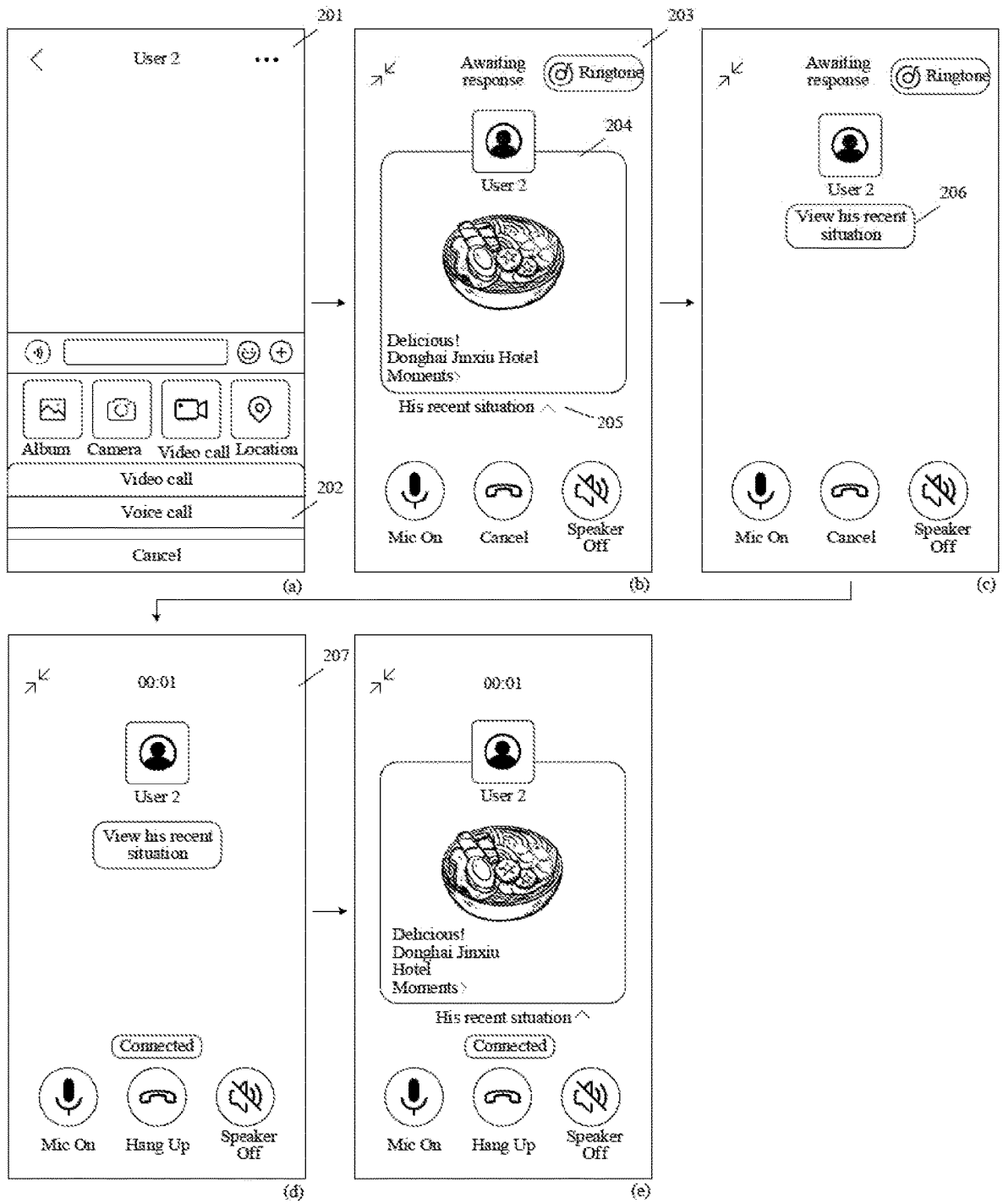
FIG. 2 is a schematic diagram of a voice call connection process according to one embodiment of this application.

In a network-based voice call scene, FIG. 2 is a schematic diagram of a voice call connection process according to one embodiment of this application. As shown in (a) of FIG. 2, a client on the first terminal displays a chat interface 201 of a first user account and a second user account, and a first user account logs in the client. When receiving a touch operation of the first user account on a voice call control 202 in the chat interface 201, the client may transmit a voice call invitation to the second user account and display a voice outgoing call-interface 203.

As shown in (b) of FIG. 2, when displaying the voice outgoing call-interface 203, the client may display a recent information control of a first form in the voice outgoing call-interface 203. The recent information control of the first form is displayed as a recent information card 204 and a folding control 205. Recent information of the second user account is displayed in the recent information card 204. The recent information belongs to social network information posted lately by the second user account, which may refer to posting within the latest time period or for the latest n times. That is, the recent information belongs to the social network information posted by the second user account within the latest time period or for the latest n times, n being a positive integer. For example, the recent information is social network information posted recently or social network information posted last.

As shown in (c) of FIG. 2, folding control 205 can trigger a folding operation for displaying the recent information control by folding from the first form to a second form. The recent information control of the second form is displayed as unfolding control 206. Unfolding control 206 can trigger an unfolding operation for displaying the recent information control by unfolding from the second form to the first form.

As shown in (d) of FIG. 2, in response to the second user account accepting the voice call invitation, the client may display a voice call interface 207, and display the recent information control of the second form, namely, the unfolding control 206, in the voice call interface 207.

As shown in (e) of FIG. 2, the client can display the recent information control of the first form in the voice call interface 207 according to the unfolding operation triggered by the unfolding control 206.

Figure 3:
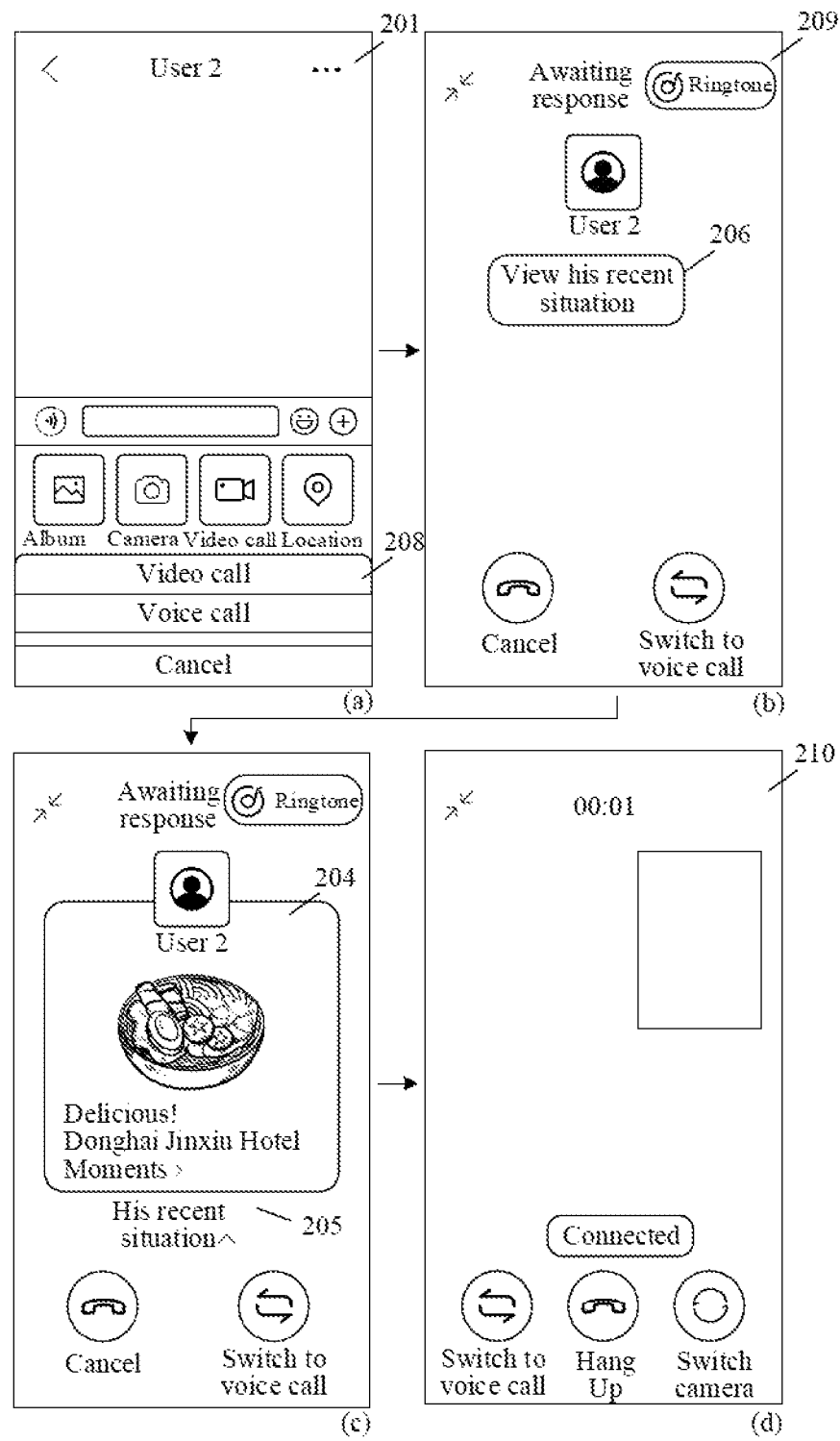
FIG. 3 is a schematic diagram of a video call connection process according to one embodiment of this application.

In a network-based video call scene, FIG. 3 is a schematic diagram of a video call connection process according to one embodiment of this application. As shown in (a) of FIG. 3, a client on the first terminal displays a chat interface 201 of a first user account and a second user account, and a first user account logs in the client. When receiving a touch operation of the first user account on a video call control 208 in the chat interface 201, the client may transmit a video call invitation to the second user account and display a video outgoing call-interface 209.

As shown in (b) of FIG. 3, when displaying the video outgoing call-interface 209, the client may display a recent information control of a second form in the video outgoing call-interface 209.

As shown in (e) of FIG. 3, the client can display the recent information control of the first form in the video outgoing call-interface 209 according to an unfolding operation triggered by an unfolding control 206, namely a recent information card 204 and a folding control 205.

As shown in (d) of FIG. 3, in response to the second user account accepting the video call invitation, the client may display a video call interface 210, and hide the recent information control according to a third form of the recent information control in the video call interface 210 according to default settings.

In some embodiments, when the client displays the recent information control in the interfaces of different call types (voice and video) and different stages (before connection and after connection), the recent information control is displayed according to the default settings. The default settings include a corresponding relationship between the interfaces of different call types and different stages and a display form of the recent information control. The client can also modify the default settings according to a configuration operation of the first user account, and display the recent information control according to the modified settings.

After a first user initiates a network call invitation to a second user, a recent information control can be displayed in a network outgoing call-interface of different call types, and recent information of the second user can be displayed through the recent information control. The second user is a user to whom the first user desires to initiate a call, and the displayed recent information of the second user helps the first user to know the recent situation of the second user and facilitates chatting between the two users. In this process, the first user is not required to perform an operation, thereby avoiding the problem that the operation of information access is cumbersome. Moreover, recent information controls of different forms can be displayed in interfaces of different call types and different stages, and the recent information controls can be unfolded and folded, thereby avoiding covering important information in a UI. The user can customize default settings for controlling the display form of the recent information control, whereby the recent information can be flexibly displayed according to user requirements, to improve the user experience.

Figure 4:
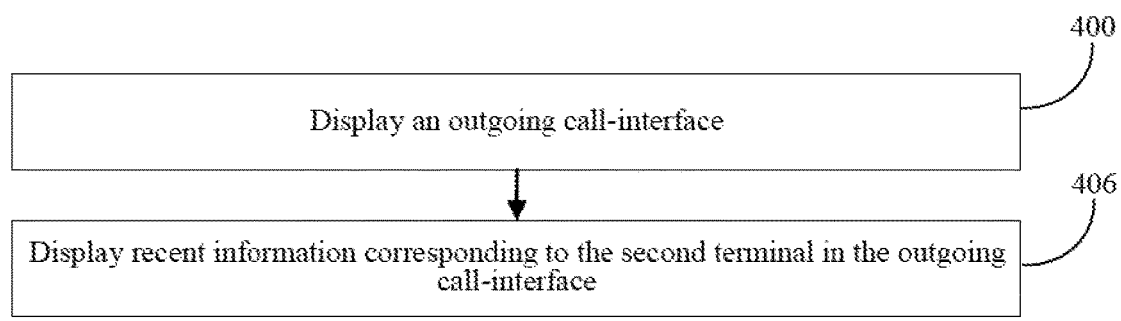
FIG. 4 is a flowchart of a call display method according to one embodiment of this application.
Figure 6:
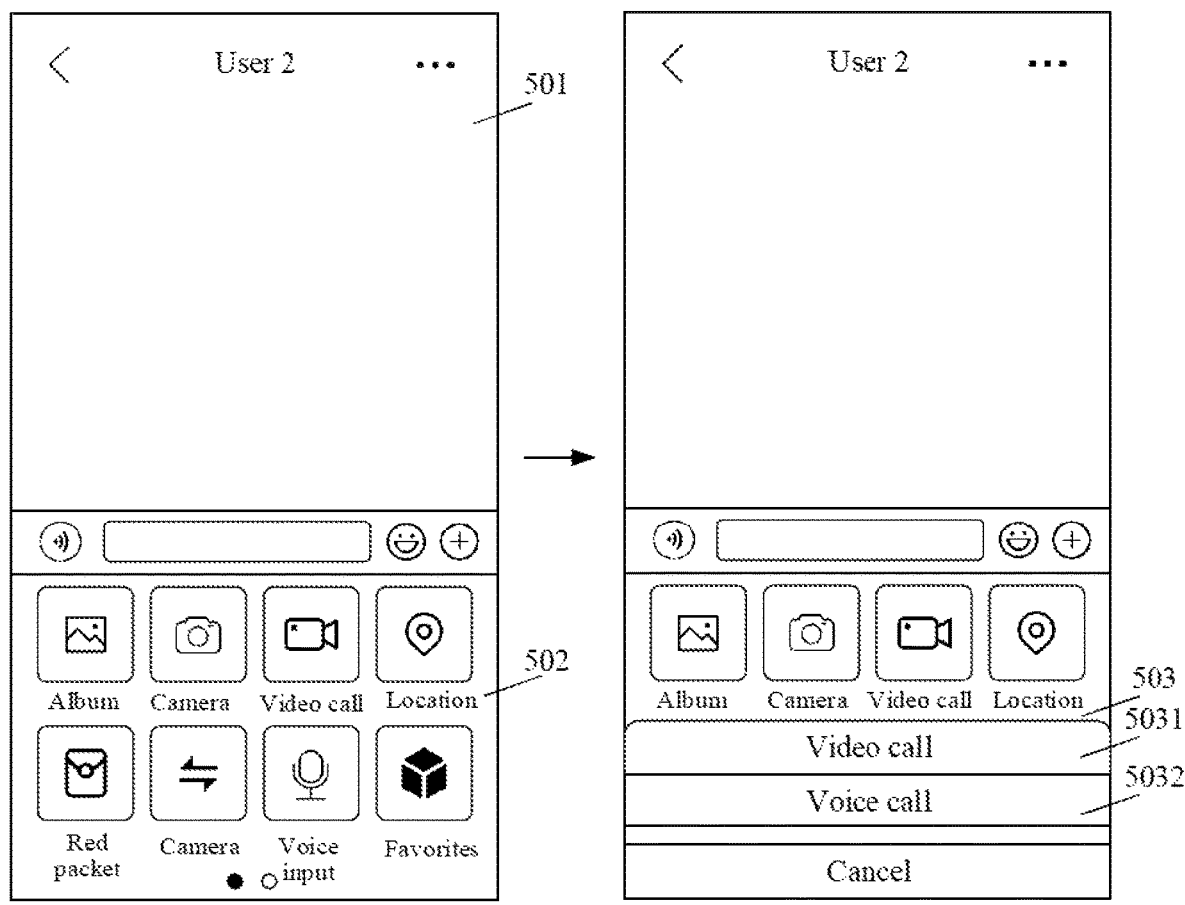
FIG. 6 is a schematic flowchart of a call display method according to one embodiment of this application.

FIG. 4 is a schematic flowchart of a call display method according to one embodiment of this application. The method may be used for a first terminal in a system as shown in FIG. 1. As shown in FIG. 6, the method includes the following steps:

Step 400: Display a outgoing call-interface.

The outgoing call-interface is a waiting interface prior to a call connection between the first terminal and a second terminal. The outgoing call-interface includes an interface displayed on a terminal of a calling party before the calling party waits for a called party to accept a call, and an interface displayed on a terminal of the called party before the called party accepts the call.

For example, the outgoing call-interface includes:
(1) a outgoing call-interface (which may also be referred to as a "call invitation interface") displayed on the first terminal when the first terminal initiates a call to the second terminal, where the first terminal is a calling party, and the second terminal is a called party; and
(2) a outgoing call-interface (which may also be referred to as a "call request interface") displayed on the first terminal when the second terminal initiates a call to the first terminal, where the first terminal is a called party, and the second terminal is a calling party.

For example, the outgoing call-interface is different from a call suspension interface. The outgoing call-interface is an interface displayed on the terminal before a call is established between the first terminal and the second terminal, and the call suspension interface is an interface displayed on the terminal when the current call is suspended after having been established between the first terminal and the second terminal (instead of ending the current call, where the call may be resumed without being re-established after the call is suspended). The call suspension interface is an interface displayed when the call between the first terminal and the second terminal is suspended after the call between the first terminal and the second terminal is connected. For example, if the first terminal establishes a call with the second terminal and then a third terminal calls the first terminal, the first terminal may suspend the call with the second terminal and connect the call with the third terminal. At this moment, a call interface between the first terminal and the second terminal is displayed as the call suspension interface.

Figure 5:
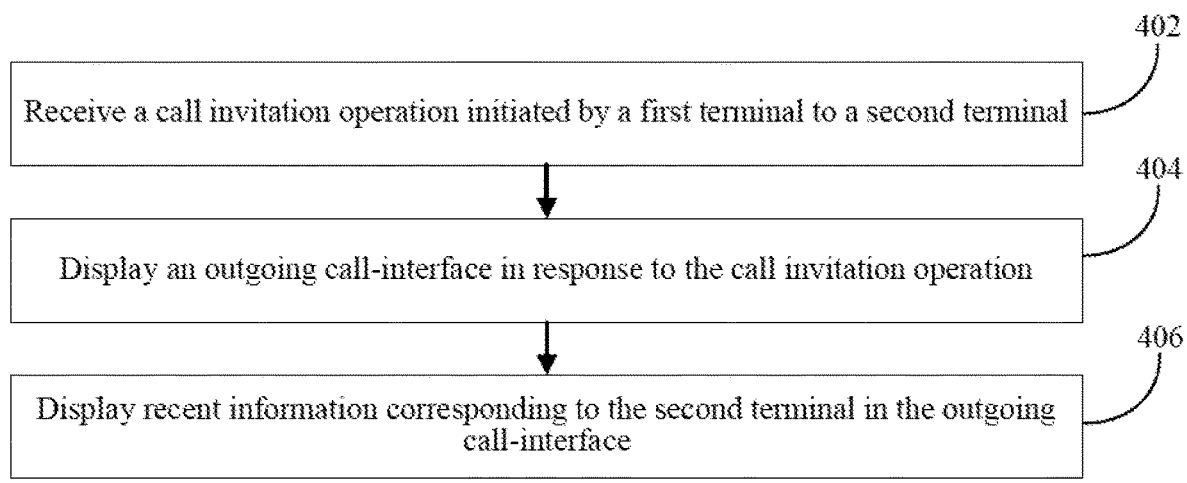
FIG. 5 is a schematic flowchart of a call display method according to one embodiment of this application.

In some embodiments, step 400 may be replaced with step 402 and step 404 in FIG. 5.

Step 402: Receive a call invitation operation initiated by a first terminal to a second terminal. The first terminal and the second terminal can perform a call based on a mobile communication network, and the first terminal and the second terminal can also make a call based on the Internet. The call between terminals based on the Internet can be realized based on clients installed on the terminals.

When the first terminal and the second terminal perform a call based on the mobile communication network, the call invitation operation refers to a phone invitation operation or a video phone invitation operation received by the first terminal and initiated by a first user using the first terminal to a second user using the second terminal. For example, the first terminal determines that the call invitation operation is received when the first user dials a phone call or a video phone call to the second user by using a phone number of the second user. The phone number of the second user includes a number provided by a telecommunication operator for the second user, a virtual number provided by a network communication service manufacturer for the second user, an account number for calling provided by the network communication service manufacturer for the second user, and the like.

When the first terminal and the second terminal perform a call based on the Internet, the call invitation operation refers to an operation initiated by the first user account to the second user account to invite the second user account to perform a network call. At this moment, the call invitation operation is a network call invitation operation, and the first terminal can receive the network call invitation operation through a first client on the first terminal. A first client is installed in the first terminal, and a first user account logs in to the first client. A second client is installed in the second terminal, and a second user account logs in to the second client.

The first client supports instant messaging, for example, an application having an instant messaging function, a web client, or an applet. The first user account includes any user account in a server corresponding to the first client. In some embodiments, the second user account includes any user account, in the server corresponding to the first client, different from the first user account. The first user account can perform network-based instant messaging with the second user account through the first client, and the second user account can be any one of user accounts having a friend relationship with the first user account. The second user account logs in to the second client. The first client and the second client are the same application or are the same type of applications on different operating system platforms.

The first client can display a chat interface. The chat interface is used for the first user account to perform instant messaging with different user accounts, including transmitting a text message, transmitting an expression, transmitting a picture, transmitting a location, transmitting a red packet, transferring money, transmitting a voice message, sharing a link, transmitting a business card, transmitting a file, transmitting a card ticket, performing a network-based video chat, performing a network-based voice chat, and the like.

The chat interface between the first user account and the second user account can display a network call invitation control. When receiving a trigger operation for the network call invitation control, the first client may receive a network call invitation operation initiated by the first user account to the second user account. The trigger operation is an operation capable of triggering a function provided by the network call invitation control, for example, a touch operation for the network call invitation control.

According to a viewing operation of the first user account to view account details of other user accounts, the first client can display an account detail interface of a user account selected for viewing by the first user account, for example, an account detail interface of the second user account. The account detail interface of the second user account can also display a network call invitation control. When receiving a trigger operation for the network call invitation control, the first client may receive a network call invitation operation initiated by the first user account to the second user account.

In some embodiments, the foregoing network call invitation control includes a voice call invitation control and a video call invitation control. Trigger operations for different network call invitation controls can trigger different types of network call invitation operations. The voice call invitation control can trigger a voice call invitation operation, and the video call invitation control can trigger a video call invitation operation.

After receiving a network call invitation operation, the first client can transmit a network call invitation to the second client through the server in response to the network call invitation operation. The network call invitation can include a voice call invitation and a video call invitation. At this moment, the second client may display the network call invitation of the first user account. If the second user account accepts the invitation, the server may establish a network-based call for the first user account and the second user account, including a voice call and a video call.

For example, FIG. 6 is a schematic diagram of a chat interface according to one embodiment of this application. As shown in FIG. 6, the first client displays a chat interface 501 of the first user account and the second user account. An account name (user 2) of the second user account is displayed in the chat interface to prompt a chat object of the first user account. A functional region 502 can be displayed in the chat interface, and controls corresponding to transmission of different types of messages are displayed in the functional region 502. The first client can display a network call floating layer 503 in the chat interface 501 according to a touch operation for a video call control. The network call floating layer 503 displays a video call control 5031 and a voice call control. The video call control 5031 can trigger a video call invitation operation inviting the second user account to perform a video call. The voice call control 5032 can trigger a voice call invitation operation inviting the second user account to perform a voice call.

Step 404: Display a outgoing call-interface in response to the call invitation operation.

When receiving the foregoing call invitation operation, the first terminal can display a outgoing call-interface. The outgoing call-interface is used for prompting the first user of the first terminal to initiate invitation of the second user of the second terminal to perform a call.

When the first terminal and the second terminal perform a call based on the mobile communication network, when the first user dials a phone call to the second user by using the phone number of the second user, the first terminal may display a phone invitation interface. When the first user dials a video phone call to the second user by using the phone number of the second user, the first terminal may display a video phone invitation interface. The phone invitation interface may or may not be the same as the video phone invitation interface. For example, the phone invitation interface and the video phone invitation interface can be interfaces displayed based on a video polyphonic ringtone. The video polyphonic ringtone can be provided by an operator providing the mobile communication network. The first user and the second user can set the content of the video polyphonic ringtone. For example, the second user can set the content of the video polyphonic ringtone displayed when the first user dials a phone call thereto.

When the first terminal and the second terminal perform a call based on the Internet, the call invitation operation is a network call invitation operation. The first terminal can display a network outgoing call-interface through the first client. That is, after receiving the network call invitation operation, the first client may display the network outgoing call-interface. The network outgoing call-interface can prompt the first user account to initiate invitation of the second user account to perform a network call and prompt the first user account of the progress of the invitation. In some embodiments, the network call invitation operation includes a voice call invitation operation and a video call invitation operation. The first client displays the same or different network outgoing call-interfaces in response to different types of network call invitation operations.

When the second user account accepts the network call invitation, the first client may display a network call interface for the first user account to perform a network call with the second user account.

Figure 7:
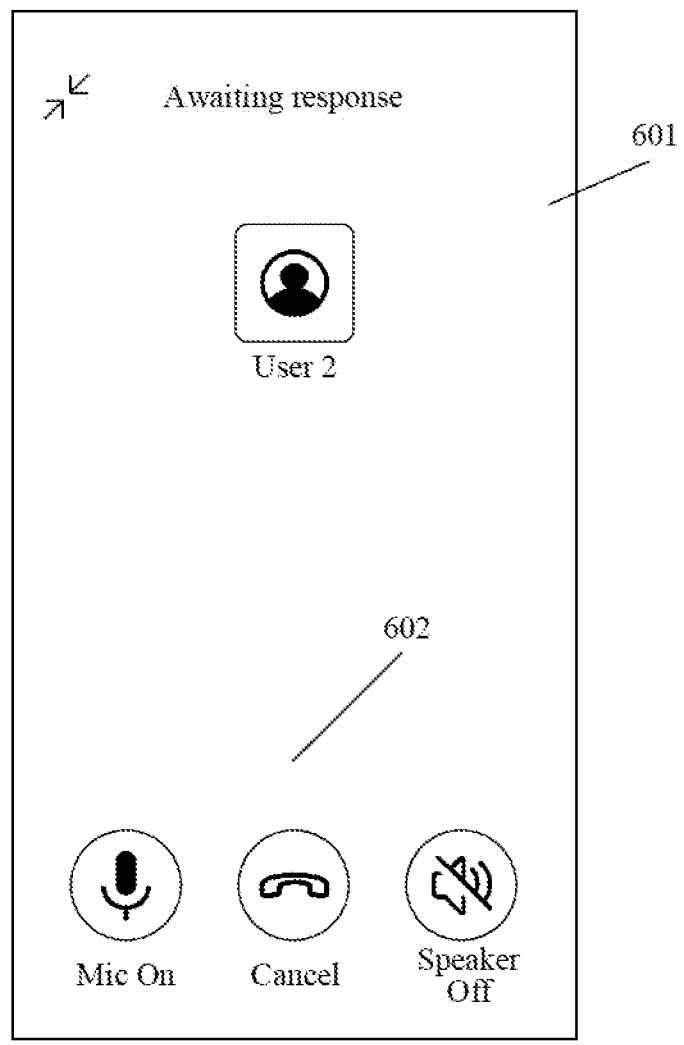
FIG. 7 is a schematic diagram of a chat interface according to one embodiment of this application.

For example. FIG. 7 is a schematic diagram of a voice outgoing call-interface according to one embodiment of this application. As shown in FIG. 7, after receiving a voice call invitation operation initiated by the first user account to the second user account, the client may display a voice outgoing call-interface 601. An account name and an avatar of the second user account are displayed in the voice outgoing call-interface 601. An operation control 602 is also displayed in the voice outgoing call-interface 601. The operation control 602 includes a microphone on/off control, a cancel control, and a speaker on/off control. The microphone on/off control is configured to manage whether the first client acquires a sound of the first user account through a microphone and transmits the sound to the second user account. The cancel control is configured to cancel a voice call invitation. The speaker on/off control is configured to control whether a speaker plays a sound of a voice call. A zoom control can also be displayed in the voice outgoing call-interface 601. The zoom control is configured to zoom out the voice outgoing call-interface 601 as a pop-up window and keep the pop-up window displayed in other UIs of the first client.

Figure 8:
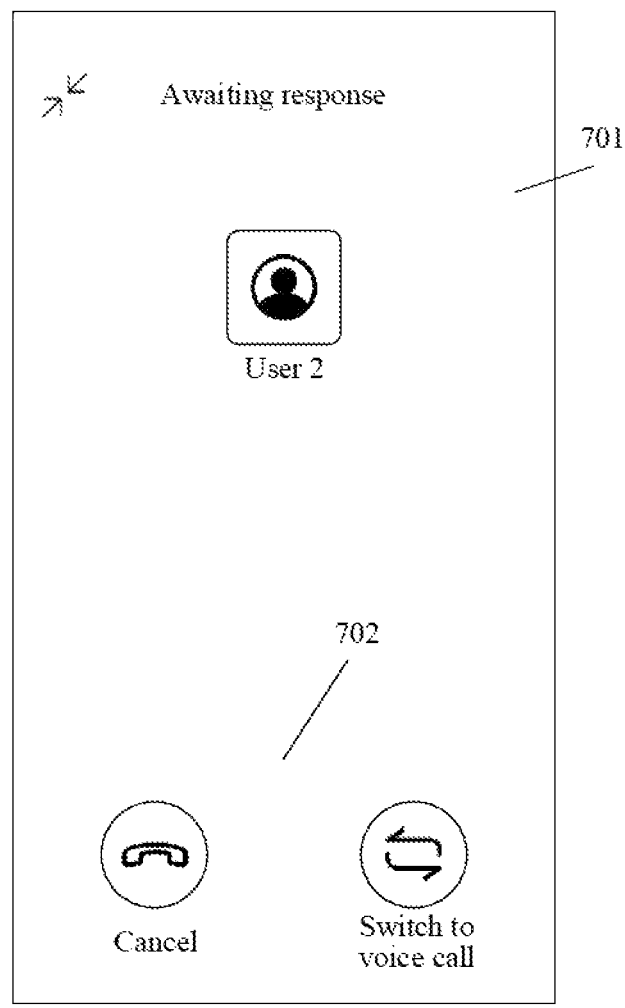
FIG. 8 is a schematic diagram of a voice outgoing call-interface according to one embodiment of this application.

For example, FIG. 8 is a schematic diagram of a video outgoing call-interface according to one embodiment of this application. As shown in FIG. 8, after receiving a video call invitation operation initiated by the first user account to the second user account, the client may display a video outgoing call-interface 701. An account name and an avatar of the second user account are displayed in the video outgoing call-interface 701. An operation control 702 is also displayed in the video outgoing call-interface 701. The operation control 702 includes a switching control and a cancelling control. The switching control is configured to switch a video call invitation currently initiated to a voice call invitation. The cancel control is configured to cancel the video call invitation. A zoom control can also be displayed in the video outgoing call-interface 701. The zoom control is configured to zoom out the video outgoing call-interface 701 as a pop-up window and keep the pop-up window displayed in other UIs of the first client.

Figure 9:
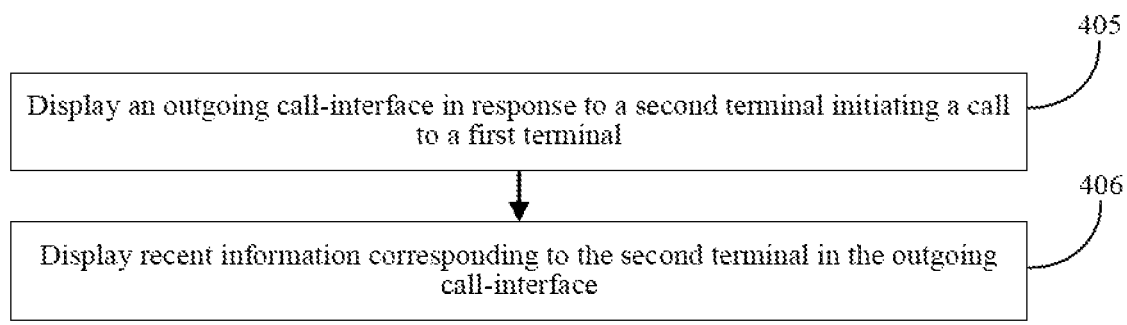
FIG. 9 is a schematic diagram of a video outgoing call-interface according to one embodiment of this application.

In some embodiments, step 400 may also be replaced with step 405 in FIG. 9.

Step 405: Display the outgoing call-interface in response to the second terminal initiating a call invitation to the first terminal.

For example, referring to the description of a call initiation process in step 402 and step 404, a call invitation is initiated by the second terminal to the first terminal in step 405.

When an instant messaging program is installed in the first terminal, the second terminal transmits a call request to a server of the instant messaging program to call with the first terminal in response to an operation of initiating a call invitation to the first terminal (first user account). The first terminal receives the call invitation of the second terminal transmitted by the server of the instant messaging program, and displays a outgoing call-interface in response to the call invitation operation.

When the first terminal communicates with the second terminal through the mobile communication network, the second terminal transmits a call request for calling with the first terminal to a base station in response to an operation of initiating a call invitation to the first terminal (first phone number). The first terminal receives the call invitation transmitted by the base station from the second terminal, and displays the outgoing call-interface in response to the call invitation.

For example, the call includes at least one of a voice call and a video call.

Step 406: Display recent information corresponding to the second terminal in the outgoing call-interface.

The recent information corresponding to the second terminal belongs to social network information posted lately by the second user account, which may refer to posting within the latest time period or for the latest n times, n being a positive integer. That, the recent information corresponding to the second terminal belongs to the social network information posted by the second user account within the latest time period or for the latest n times, n being a positive integer. The latest time period is a time period with a current time as an end location and tracing forward for preset duration, for example, the latest 3 days of the current time. For example, the recent information can be social network information posted by the second user account within the latest time period closest to the current time, or social network information posted last by the second user account. In some embodiments, in addition to the foregoing basis, the recent information can also be social network information which is not recessed by the first user account and posted by the second user account. The first user account is a user account corresponding to the first terminal. In some embodiments, the first user account and the second user account are accounts under the same platform or accounts under different platforms, but the first user account can have access to the social network information posted by the second user account.

In some embodiments, when the first terminal communicates with the second terminal based on the mobile communication network, the second user account corresponding to the second terminal includes at least one of a user account logging in a social client installed in the second terminal, a user account having a binding relationship with a mobile phone number of the second user, and the mobile phone number of the second user.

For example, when the second user account corresponding to the second terminal is a user account logging in a social client (for example, the second client) installed in the second terminal, the user account logging in the social client has a binding relationship or does not have a binding relationship with a mobile phone account of the second user. The second terminal is installed with the social client, and the social client supports transmitting the social network information or the recent information of the second user account to a target device, whereby the first terminal displays the recent information of the second user account on the outgoing call-interface. The target device is the first terminal, or the target device is a device for providing the first terminal with the recent information. For example, the target device is a background server of a video polyphonic ringtone operator. In some embodiments, a user is supported to customize whether the social client supports displaying the recent information on the outgoing call-interface.

When the second user account corresponding to the second terminal is a user account having a binding relationship with the mobile phone number of the second user, the user account is In some embodiments registered in the social client through the mobile phone number of the second user, thereby achieving binding. The social client is installed or not installed in the second terminal. If the social client is installed, the social client supports transmitting the social network information or the recent information of the second user account to a target device, or a server of the social client transmits the social network information or the recent information of the second user account to the target device, whereby the first terminal displays the recent information of the second user account on the outgoing call-interface. If the social client is not installed, the social client supports transmitting the social network information or the recent information of the second user account to a target device by the server of the social client, whereby the first terminal displays the recent information of the second user account on the outgoing call-interface. The target device is the first terminal, or the target device is a device for providing the first terminal with the recent information. For example, the target device is a background server of a video polyphonic ringtone operator. In some embodiments, a user is supported to customize whether the social client supports displaying the recent information on the outgoing call-interface.

When the second user account corresponding to the second terminal is a mobile phone number of the second user, the mobile phone number of the second user In some embodiments supports logging in the social client, and the social client is installed or not installed in the second terminal. If the social client is installed, the social client supports transmitting the social network information or the recent information corresponding to the mobile phone number of the second user to a target device, or a server of the social client transmits the social network information or the recent information corresponding to the mobile phone number of the second user to the target device, whereby the first terminal displays the recent information of the second user account on the outgoing call-interface. If the social client is not installed, the social client supports transmitting the social network information or the recent information corresponding to the mobile phone number of the second user to a target device by the server of the social client, whereby the first terminal displays the recent information of the second user account on the outgoing call-interface. The target device is the first terminal, or the target device is a device for providing the first terminal with the recent information. For example, the target device is a background server of a video polyphonic ringtone operator. In some embodiments, a user is supported to customize whether the social client supports displaying the recent information on the outgoing call-interface.

When the first terminal communicates with the second terminal based on the mobile communication network, the first terminal displays the recent information in a phone invitation interface or displays the recent information in a video phone invitation interface. The recent information is displayed based on a video polyphonic ringtone. If the second user account corresponds to multiple social clients (including the foregoing clients needing to be installed or not needing to be installed) supporting displaying the recent information. In some embodiments, the second user account selects a target client from the foregoing multiple social clients. The target client is a client for providing the recent information for the video polyphonic ringtone. One or more target clients are provided. If there are multiple target clients, the recent information displayed by the first terminal In some embodiments supports to be switched, and the social client to which the recent information belongs may be displayed while the recent information is displayed. In some embodiments, the social client provides information of multiple dimensions as the recent information, and the second user account selects a specified dimension among the various dimensions provided by the various social clients to provide the recent information.

For example, the social client supporting displaying the recent information includes client 1 and client 2, and client 2 provides information of two dimensions as the recent information, respectively information posted in a social circle and a posted short video. The first terminal displays the recent information based on the dimensions of the client and the information selected by the second user account. For example, the recent information provided by client 1 and the recent information provided by client 2 are displayed, and the displayed recent information provided by client 2 includes two dimensions of the information posted by the social circle and the posted short video.

When the first terminal communicates with the second terminal based on the Internet, the first terminal is installed with the first client, and the second terminal is installed with the second client. The second user account corresponding to the second terminal can refer to a user account logging in to the second client by the user using the second terminal. At this moment, when the call invitation operation is a network call invitation operation, the outgoing call-interface is a network outgoing call-interface, and the first terminal can display the recent information of the second user account in the network outgoing call-interface through the first client on the first terminal.

The foregoing social network information is information having a social attribute, and can specifically be information posted by the second user account in a client having the social attribute, for example, information posted by the second user account in the second client supporting instant messaging. The social network information enables the second user account to perform social networking with another user account. For example, the social network information is posted by the second user account and can be accessed by another user account.

In some embodiments, the recent information includes information posted by the second user account in a social circle, a short video posted by the second user account, a user status posted by the second user account, a user signature posted by the second user account, a message posted by the second user account, a shared album posted by the second user account, a geographical location posted by the second user account, information accessed recently by the second user account, motion information of the second user account, and the like.

The information posted by the second user account in the foregoing dimension can be stored in the server or cached in the first client. When needing to display the recent information of the second user account, the first client may obtain the information of the foregoing dimension from the server and determine the recent information therefrom, or the first client directly obtains the recent information from the server, or the first client determines the recent information according to cached data.

In some embodiments, the outgoing call-interface is an interface displayed by a first application (first client), the second user account logs in the first application (first client) of the second terminal, and the recent information may be information posted by the second user account on the first application.

In some embodiments, the recent information may also be information posted by the second user account on another application. For example, login information of the second user account may be login of multiple applications. A server of the first application obtains the recent information posted by the second user account on another application. The server of the first application transmits the recent information to the first client on the first terminal. The first client displays the recent information on the outgoing call-interface of the first application.

For example, the first application is run on the first terminal, and the first application is run on the second terminal. The first user account logs in the first application of the first terminal, the second user account logs in the first application of the second terminal, and the second user account corresponds to authorization login information of the second application. Then in response to the first terminal and the second terminal trying the first application to initiate a call, the first application of the first terminal obtains an authorization login list corresponding to the second user account. The authorization login list includes a second application. The first application (client or server) obtains recent information posted by the second user account in the second application from the second application (client or server). The first application of the first terminal displays the recent information posted by the second user account in the second application on the outgoing call-interface.

The recent information is information posted by the second terminal or the second user account on the second terminal, namely, information posted by the other party participating in the call, rather than information provided by other information providers (for example, advertisement information provided by the operator). The first terminal calls with different terminals to display different recent information corresponding to the different terminals.

In some embodiments, when the second terminal includes multiple terminals, namely, when the first terminal invites multiple second terminals to perform a call through the mobile communication network or the Internet, the first terminal can simultaneously display recent information corresponding to different second terminals on the outgoing call-interface based on the foregoing manner. Or the recent information corresponding to one of the multiple second terminals is displayed on the outgoing call-interface, and a function of switching to display the recent information corresponding to the other second terminals is provided. Or the recent information corresponding to some of the multiple second terminals is displayed on the outgoing call-interface, and a function of switching to display the recent information corresponding to the other second terminals is provided.

In some embodiments, when the first terminal is a calling party and the call is a video call, a video picture photographed in real time by a camera of the first terminal may be displayed on the outgoing call-interface of the first terminal, and the video picture and recent information corresponding to the second terminal may be simultaneously displayed on the outgoing call-interface. The outgoing call-interface may also display an unfolding control corresponding to the video picture and the recent information. In response to an unfolding operation on the unfolding control, the video picture is displayed as the recent information instead, or in response to an unfolding operation on the unfolding control, the video picture and the recent information are displayed simultaneously. When the video picture and the recent information are simultaneously displayed on the outgoing call-interface, the regional distribution of the two kinds of information in the interface may be arbitrary, for example, up-down distribution or left-right distribution.

In summary, according to the method provided in this embodiment, after a first user initiates a call invitation to a second user, recent information of the second user can be displayed in an outgoing call-interface. The second user is a user to whom the first user desires to initiate a call, and the displayed recent information of the second user helps the first user to know the recent situation of the second user and facilitates chatting between the two users. In this process, the first user is not required to perform an operation, thereby avoiding the problem that the operation of information access is cumbersome.

Figure 10:
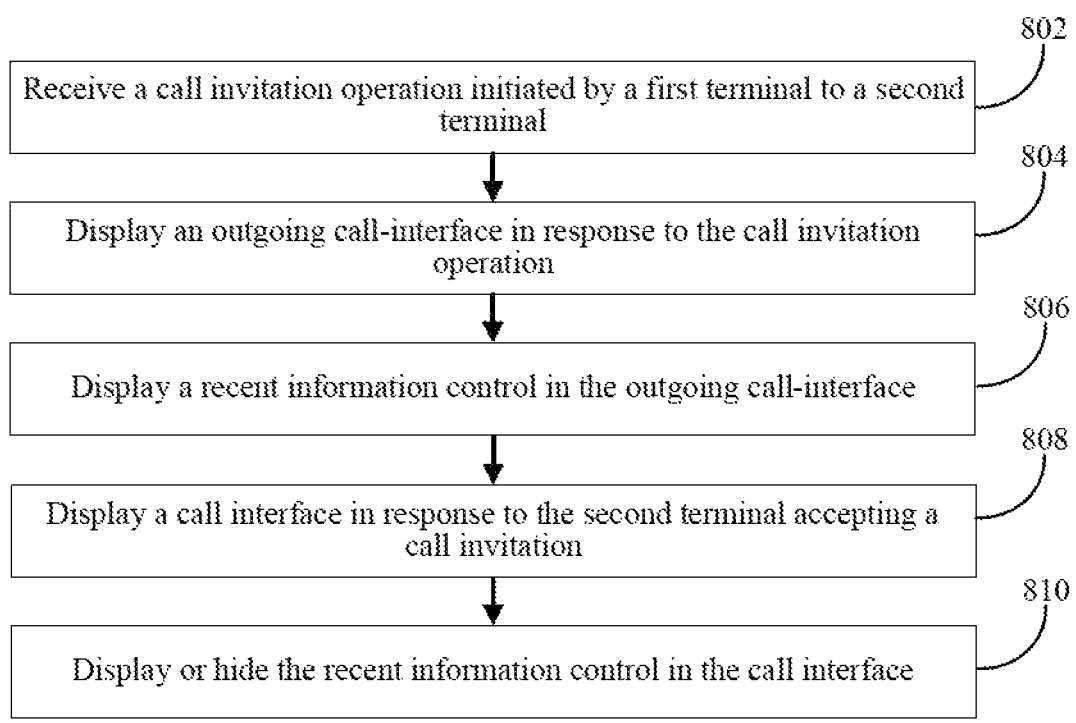
FIG. 10 is a schematic flowchart of a call display method according to one embodiment of this application.

FIG. 10 is a schematic flowchart of a call display method according to one embodiment of this application. The method may be used for a first terminal in a system as shown in FIG. 1. As shown in FIG. 10, the method includes the following steps:

Step 802: Receive a call invitation operation initiated by a first terminal to a second terminal.

The first terminal receives a call invitation operation when a first user of the first terminal initiates a phone call, a video phone call based on a mobile communication network to a second user using the second terminal by using a phone number of the second user.

The first terminal can also receive the call invitation operation through a first client. At this moment, the call invitation operation can refer to a network call invitation operation. The network call invitation operation is initiated from a first user account to a second user account through the Internet. The first user account logs in to the first client in the first terminal, and the second user account logs in a second client in the second terminal.

In some embodiments, the first client can determine, according to a trigger operation of the first user account on a network call invitation control displayed by the first client, a voice instruction of the first user account, and a gesture operation of the first user account in the first client, that the network call invitation operation is received.

For example, upon receiving the trigger operation of the first user account on the network call invitation control displayed in a chat interface of the first user account and the second user account, the first client may determine that the network call invitation operation is received. Or, upon receiving the trigger operation on the network call invitation control displayed in an account detail interface of the second user account, the first client may receive the network call invitation operation. Or the network call invitation operation may be received when the first client receives a specified voice. Or the network call invitation operation may be received when the first client receives a specified gesture.

The foregoing specified voice can include "and a second user account voice", "and a second user account video", and the like. The foregoing specified gesture can be set by the first user account. The first user account can set a gesture shape in the first client and a function correspondingly triggered. For example, when the first client displays a UI, the first user account draws a number 5 in the UI through a gesture, namely, triggering the network call invitation operation initiated to the second user account.

In some embodiments, the foregoing network call invitation operation includes at least one of a voice call invitation operation and a video call invitation operation. The voice call invitation operation is used for inviting the second user account to perform a network-based voice call with the first user account. The video call invitation operation is used for inviting the second user account to perform a network-based video call with the first user account.

Step 804: Display a outgoing call-interface in response to the call invitation operation.

In some embodiments, when the first user dials a phone call to the second user by using the phone number of the second user, the first terminal may display a phone invitation interface. When the first user dials a video phone call to the second user by using the phone number of the second user, the first terminal may display a video phone invitation interface. After receiving a network call invitation operation initiated by the first user account to the second user account, the first client on the first terminal may display a network outgoing call-interface. In some embodiments, the network call invitation operation includes a voice call invitation operation. The first client may display a voice outgoing call-interface in response to the voice call invitation operation. The network call invitation operation can further include a video call invitation operation. The first client may display a video outgoing call-interface in response to the video call invitation operation. The voice outgoing call-interface and the video outgoing call-interface are the same or different.

Figure 11:
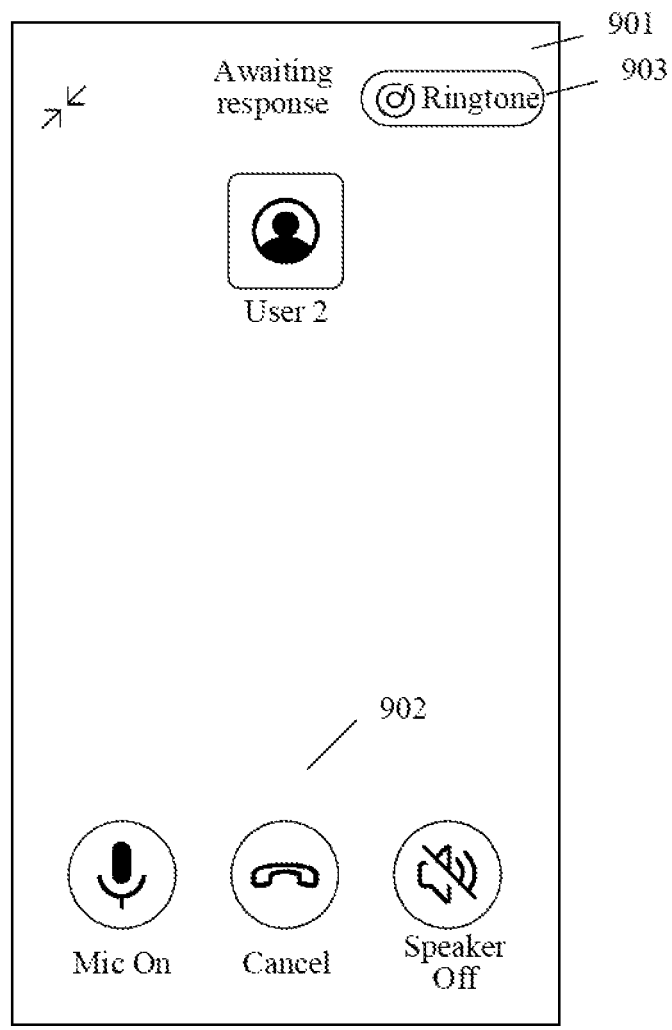
FIG. 11 is a schematic diagram of a voice outgoing call-interface according to one embodiment of this application.

For example, FIG. 11 is a schematic diagram of a voice outgoing call-interface according to one embodiment of this application. As shown in FIG. 11, an account name and an avatar of the second user account are displayed in the voice outgoing call-interface 901. An operation control 902 is also displayed in the voice outgoing call-interface 901. The operation control 902 includes a microphone on/off control, a cancel control, and a speaker on/off control. A zoom control can also be displayed in the voice outgoing call-interface 901. The zoom control is configured to zoom out the voice outgoing call-interface 901 as a pop-up window and keep the pop-up window displayed in other UIs of the first client. In some embodiments, a ring icon 903 is also displayed in the voice outgoing call-interface 901. In the process of displaying the voice outgoing call-interface 901, the first client may play a calling ringtone, and display a vibration animation of the ring icon 903 following the played calling ringtone in the outgoing call-interface. The calling ringtone can be a ringtone set for the first user account. When the first user account sets a ringtone for a voice call, the first client may display the ring icon 903 in the voice outgoing call-interface 901. When the first user account does not set the ringtone for the voice call, the first client does not display the ring icon 903 in the voice outgoing call-interface 901.

Figure 12:
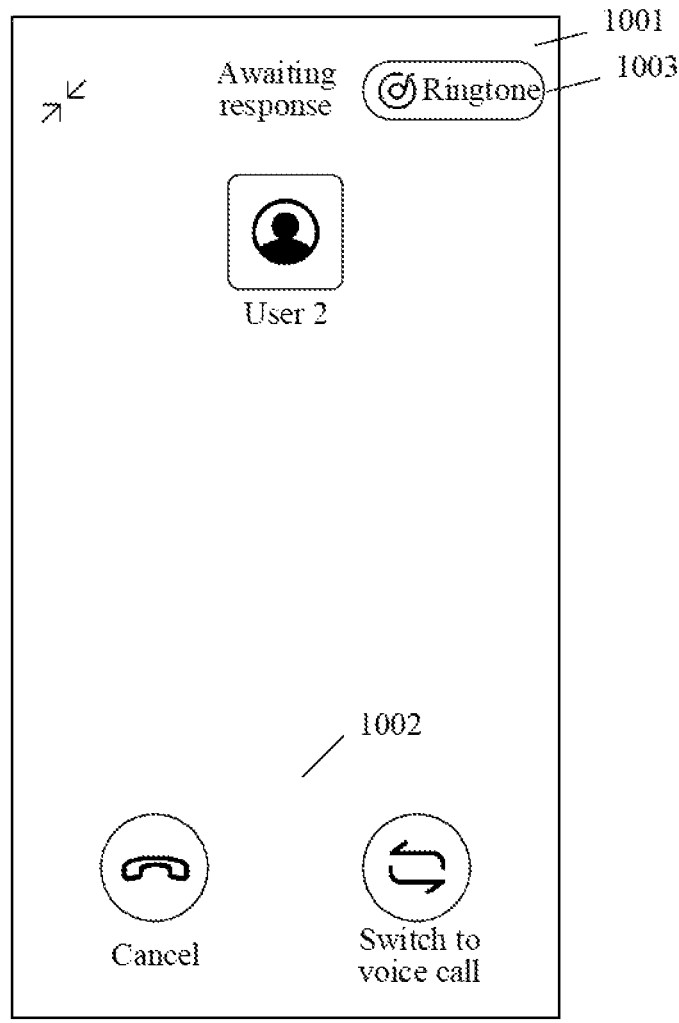
FIG. 12 is a schematic diagram of a video outgoing call-interface according to one embodiment of this application.

For example, FIG. 12 is a schematic diagram of a video outgoing call-interface according to one embodiment of this application. As shown in FIG. 12, an account name and an avatar of the second user account are displayed in the video outgoing call-interface 1001. An operation control 1002 is also displayed in the video outgoing call-interface 1001. The first client can use a video picture corresponding to the first user account acquired by a camera as a display background in the video outgoing call-interface 1001. The operation control 1002 includes a switching control and a cancel control. A zoom control can also be displayed in the video outgoing call-interface 1001. The zoom control is configured to zoom out the video outgoing call-interface 1001 as a pop-up window and keep the pop-up window displayed in other UIs of the first client. In some embodiments, a ring icon 1003 is also displayed in the video outgoing call-interface 1001. The ring icon 1003 is the same as the ring icon in the voice outgoing call-interface. In the process of displaying the video outgoing call-interface 1003, the first client may play a calling ringtone, and display a vibration animation of the ring icon 1003 following the played calling ringtone in the outgoing call-interface. The calling ringtone of a video call is the same as or different from the calling ringtone of a voice call. The first user account can set the same ringtone or different ringtones for the video call and the voice call. When the first user account sets a ringtone for the video call, the first client may display the ring icon 1003 in the video outgoing call-interface 1001. When the first user account does not set the ringtone for the video call, the first client does not display the ring icon 1003 in the video outgoing call-interface 1001.

Step 806: Display a recent information control in the outgoing call-interface.

The recent information control is configured to display recent information of a second user account corresponding to the second terminal in the outgoing call-interface. The recent information belongs to the social network information posted by the second user account within the latest time period or for the latest n times, n being a positive integer. In some embodiments, the second user account corresponding to the second terminal can refer to a user account logging in the second client by the user using the second terminal.

The first terminal can display the recent information control on the phone invitation interface or display the recent information control on the video phone invitation interface. In some embodiments, the recent information control is displayed based on a video polyphonic ringtone.

When the call invitation operation is a network call invitation operation, the outgoing call-interface is a network outgoing call-interface, and the first terminal can display the recent information control in the network outgoing call-interface through the first client on the first terminal.

In some embodiments, in the presence of social network information of multiple second user accounts, the recent information can be information determined based on a social network information sorting result. The process of sorting can be performed by the first terminal, the first client, or a server. Sorting rules include sorting according to the number of likes, sorting according to the number of browses, sorting according to a posting time, sorting according to whether the first user account accesses, and the like. The sorting result can be determined by sorting the social network information by one or more of the foregoing rules.

In some embodiments, the recent information can be social network information posted closest to a current time in the social network information posted by the second user account within the latest time period. Or the recent information is social network information last posted by the second user account. In some embodiments, in addition to the foregoing basis, the recent information also satisfies: the recent information is information not accessed by the first user account in the social network information posted by the second user account. The first user account is a user account corresponding to the first terminal, for example, a user account logging in to the first client on the first terminal. That is, the recent information not only belongs to the social network information posted by the second user account within the latest time period or for the latest n times, but also is information not accessed by the first user account. For example, the recent information is social network information which is posted closest to the current time and has not been accessed by the first user account in the social network information posted by the second user account within the latest time period. In some embodiments, in addition to the foregoing basis, the recent information can also satisfy: the recent information is information accessed by the first user account under the permission in the social network information posted by the second user account. The recent information can also include a posting time of the recent information for prompting the first user account when the recent information was posted by the second user account.

The foregoing social network information is information having a social attribute, and can specifically be information posted by the second user account in a client having the social attribute, for example, information posted by the second user account in the second client supporting instant messaging. The social network information enables the second user account to perform social networking with another user account. For example, the social network information is posted by the second user account and can be accessed by another user account. In some embodiments, the recent information can further include social network information posted by the second user account in a client other than the second client. For example, the second user account can establish a binding relationship with user accounts in the other clients, or directly log in the other clients through the second user account. Then the social network information posted by the second user account, or the account bound by the second user account in the other clients can also become the recent information of the second user account. That is, the second user account may intercommunicate with each other through the social network information posted by the corresponding user account in a same ecological chain.

In some embodiments, the recent information includes at least one of the following information:
information posted by the second user account in a social circle;
a short video posted by the second user account;
a user status posted by the second user account;
a user signature posted by the second user account;
a message posted by the second user account;
a shared album posted by the second user account; or
a geographical location posted by the second user account.

The social circle is composed of the second user account and a user account having a friend relationship with the second user account, and the social circle can refer to moments. The information posted by the second user account in the social circle includes at least one of text, a picture, and a video. And the information that can become the recent information is the information originally created by the second user account in the information posted by the second user account in the social circle. When the information posted by the second user account in the social circle also corresponds to a point of interest (POI), namely, a location to which the posted information corresponds, the recent information can further include the POI.

The short video includes a video posted by the second user account through a short video social function of the second client, such as a video posted in a video number. In some embodiments, when the second user account opens a video number function and the second user account sets a business card of the video number thereof on the account detail interface of the second user account for display, the short video posted by the second user account in the video number may be used as the recent information. And the short video posted by the second user account is a public and non-illegal video. When the short video corresponds to a POI, the recent information can further include the POI.

The user status is posted by the second user account through the second client. The user status includes at least one of text, a video, a picture, and an icon reflecting the user status. The icon reflecting the user status is selected by the second user account in the second client and can also be customized by the second user account. The user status can further include non-original information shared by the second user account, such as music, short videos in video numbers, livestreaming information, and merchant information. The information further includes specific details corresponding thereto, such as a song name, an account name of a user account corresponding to a video number, a livestreaming room name, and a merchant name. When the user status corresponds to a POI, the recent information can further include the POI.

The user signature is posted by the second user account through the second client. The user signature can include text, a picture, a video, and a POL. The message includes information posted by the second user account for other users through the second client. For example, the first user account comments on information posted by the second user account in the social circle, and the second user account leaves a message for the comment. The message can further include information of an object to which the message is directed, for example, including the last message to which the message corresponds, and information of a user account that posted the last message. The shared album includes an album created by the second user account in the second client and shared by the second user account. The shared album also corresponds to description information. The geographical location includes a location where the second user account is selected by the second client and performs posting. The geographical location also corresponds to description information.

In some embodiments, the recent information can further include information of an event related to the second user account in which an event time is a first time period before a current time, or the event time is a second time period after the current time, or the event time is the current time. The first time period and the second time period are set by the server. The information of the event can include information of a birth date of the second user account, information of a registration time of the second user account, information of an event generating a preset behavior with the second user account, information of an event set by the second user account, and the like. The preset behavior can be set by the server, for example, making a friend with the second user account, transmitting a red packet to the second user account for the first time, chatting with the second user account for the first time, chatting with the second user account for more than m hours in a single video or voice chat with the second user account, and the like.

In some embodiments, the recent information can be determined by the first client (or first terminal), by the server, and by the first client in cooperation with the server.

When the first client determines the recent information:

The first client can periodically cache the social network information posted by the second user account. When it is necessary to determine the recent information of the second user account, the first client can determine the recent information from the cached information according to the conditions satisfied by the foregoing recent information. For example, the social network information posted by the second user account within the latest time period or for the latest n times is first determined from the cached information, and then the recent information is determined from the determined information according to the conditions satisfied by the foregoing recent information.

When the server determines the recent information:

After receiving a network call request transmitted from the first user account to the second user account, the server may first determine the social network information posted by the second user account within the latest time period or for the latest n times, determine the recent information according to the conditions satisfied by the foregoing recent information from the determined information, and then transmit the recent information to the first client.

When the first client determines the recent information in cooperation with the server:

After receiving the network call request transmitted from the first user account to the second user account, the server can also transmit the social network information posted by the second user account within the latest time period or the social network information posted for the latest n times to the first client. The first client can obtain the foregoing information from the server, and then determine the recent information from the social network information posted within the latest time period, or the social network information posted for the latest n times. For example, the social network information posted closest to the current time is determined as the recent information from the social network information posted within the latest time period, or the social network information posted last is determined as the recent information from the social network information posted for the latest n times.

For example, after receiving a network call invitation operation of the first user account on the second user account, the first client may transmit a network call request to the server, and requests to obtain the social network information of the second user account through a common gateway interface (CGI). The network call request is used for notifying the second user account that the first user account initiates a network call invitation thereto. The network call request can include at least one of a voice call request and a video call request. After receiving the network call request, the server may also transmit the social network information posted by the second user account within the latest time period to the first client. The latest time period can be the last x days, x being set by the server, for example, the last 3 days. The first client can obtain the social network information posted by the second user account within the latest time period from the server, and then determine, from the social network information posted within the latest time period, the social network information posted closest to the current time as the recent information.

When the first client (or first terminal) or the server determines that the second user account does not have the recent information, the first terminal does not display the recent information in the outgoing call-interface, namely, does not display the recent information control. When the outgoing call-interface is a network outgoing call-interface, the first client does not display the recent information control in the network outgoing call-interface at this moment.

In some embodiments, in response to receiving the call invitation operation of the first terminal again, the first terminal can display the refreshed recent information on the outgoing call-interface. The refreshed recent information is different from the recent information not refreshed.

The operation that the first terminal receives the call invitation operation of the first terminal again can include that the first client transmits the network call invitation to the second user account after receiving the foregoing network call invitation operation, and after the second user account rejects the invitation, the first user account received by the first client initiates the network call invitation operation to the second user account. And after receiving the foregoing network call invitation operation, the first client transmits the network call invitation to the second user account. After the second user account accepts the invitation and completes the network call with the first user account, the first user account received by the first client initiates the network call invitation operation to the second user account.

The refreshed recent information includes any one of the following:
- social network information recently posted by the second user account between the last two network call invitation operations;
- the last social network information posted by the second user account before the recent information not refreshed; or
- the last social network information which is posted by the second user account before the recent information not refreshed and is not accessed by the first user account.

In some embodiments, when the second user account posts new social network information between the last two network call invitation operations, the recently posted social network information may be determined as the refreshed recent information. The recently posted social network information can also be the social network information posted recently or the social network information posted last, or the social network information not accessed by the first user account on this basis.

The last social network information posted before the recent information not refreshed is the social network information posted before the recent information not refreshed and closest to the posting time of the recent information not refreshed.

In a case of determining the last social network information posted by the second user account before the recent information not refreshed, the social network information not accessed by the first user account can be determined on this basis, thereby obtaining the last social network information which is posted by the second user account before the recent information not refreshed and is not accessed by the first user account. The access can include access to only the recent information, and can also include access in any interface of the first client.

In some embodiments, the foregoing process of determining the refreshed recent information can be performed by the first client, by the server, or by the first client in cooperation with the server. The specific process may be similar to the description of the process of determining the recent information, and will not be described in detail herein.

For example, the social network information for determining the recent information obtained by the first client after the first user account initiates the network call invitation with the second user account for the first time is an information set A. Information set A includes information 1, information 2, information 3, and information 4. Information 1, information 2, information 3, and information 4 are arranged in the descending order of the posting time from the current time. At this moment, the first client determines information 4 as the recent information of the second user account.

The social network information for determining the recent information obtained by the first client after the first user account initiates the network call invitation with the second user account for the second time is an information set B. The first user account initiates the second invitation following the first invitation. The second user account posts new social network information after the first invitation of the first user account. Information set B includes information 1, information 2, information 3, information 4, and information 5. Information 5 is recently posted information. At this moment, the first client determines information 5 as the recent information of the second user account.

The social network information for determining the recent information obtained by the first client after the first user account initiates the network call invitation with the second user account for the third time is an information set C. The first user account initiates the third invitation following the second invitation. The second user account does not post new social network information after the second invitation of the first user account, and the information set B is the same as the information set C. The first client has determined information 5 and information 4 as the recent information, and the recent information determined at this time is information 3. If the current network call invitation ends and the second user account does not post new social network information in the next process of the first user account initiating the network call invitation, the first client may determine information 2 as the recent information in the next time. If all the social network information is taken as the recent information and the second user account does not post new social network information, the second user account does not have the recent information, or information 1 is continuously determined as the recent information until the new social network information is posted by the second user account.

When the first client needs to obtain the recent information, the first client or the server may determine the recent information of the second user account in the foregoing manner. When the first terminal needs to obtain the recent information, the first terminal or the server may determine the recent information of the second user account in the foregoing manner. The specific determination method may be similar to the method of determining the recent information by the first client.

In some embodiments, obtaining the recent information includes displaying the recent information based on the recent information control according to the network call invitation, having displayed the recent information, and receiving a refresh operation or a switching operation of the first user account on the recent information. For example, a UI displaying the recent information may display a switching control. The first client or the server may determine recent information different from the currently displayed recent information in response to the switching operation on the switching control. Or the first client or the server may determine recent information different from the currently displayed recent information in response to a sliding operation on the displayed recent information. The sliding operation can include a pull-down operation, a left slide operation, a right slide operation, and the like.

For example, the second user account needs to satisfy at least one of the following conditions, and the first client or the server can determine the recent information satisfying the foregoing conditions in the social network information corresponding to the second user account:

the second user account now has a user status;
the second user account has posted moments within three days, the moments being visible to the first user account;
the second user account has posted information in a video number within three days, and displays a video number business card thereof in an account detail interface.

When the first terminal displays the recent information of the second user account through the recent information control, the first terminal can display a recent information control of a first form in the outgoing call-interface, or the first terminal can display a recent information control of a second form in the outgoing call-interface. The recent information control of the first form is displayed as a recent information card, and the recent information is displayed in the recent information card. The recent information control of the second form is displayed as an unfolding control. The unfolding control includes a fixed button, a suspension button, a pop-up window, a floating layer, a click/tap hotspot corresponding to text describing an unfolding function, and the like. When the outgoing call-interface is a network outgoing call-interface, the first terminal can display the recent information control of the foregoing form in the network outgoing call-interface through the first client.

The recent information control supports switching between the first form and the second form. In some embodiments, the first terminal can display a folding control in the outgoing call-interface displaying the recent information card. The folding control is displayed, for example, above or below the recent information card. The folding control includes a fixed button, a suspension button, a pop-up window, a floating layer, a click/tap hotspot corresponding to text describing a folding function, and the like. The first terminal can display, in response to a folding operation triggered on the folding control, the recent information control by folding from the first form to the second form. The folding operation can be triggered by a trigger operation on the folding control. The trigger operation is an operation capable of triggering a function provided by the folding control, such as a touch operation on the folding control.

The first terminal can display, in response to an unfolding operation triggered on the unfolding control, the recent information control by unfolding from the second forma to the first form. The unfolding operation can be triggered by a trigger operation on the unfolding control. The trigger operation is an operation capable of triggering a function provided by the unfolding control, such as a touch operation on the unfolding control. The foregoing switching process can also be implemented by the first client on the first terminal.

The recent information is displayed in the recent information card. The recent information card refers to elements displayed in the form of cards, such as pop-up windows, floating layers, status bars, or fixed display regions. In some embodiments, the recent information card can be circular, rectangular, and square in shape. The recent information card can be displayed in a fixed location position, or the recent information card is a pop-up window and can support dragging as well as zooming. The recent information card can also support transparent displaying, and the transparency of the transparent displaying can be set by the first user account. The recent information includes text, pictures, and videos. When the recent information is a picture and includes multiple pictures, the recent information card can display the pictures in turn according to a preset speed, and can also switch the displayed pictures according to the sliding operation of the first user account. The preset speed can be set by the first user account. When the recent information is a video, a picture played by the video is displayed in the recent information card, namely, the video is displayed and played. And, for different types of recent information and different formats of recent information, the corresponding display shape and display size of the recent information card are the same or different. For example, if the recent information is a video, the recent information card is displayed as a large rectangular card. If the recent information is a picture, the recent information card is displayed as a large rectangular card. If the recent information is plain text, the recent information card is displayed as a small rectangular card. If the recent information is a user status and the user status only includes a corresponding picture (including a default empty status or a custom empty status), the recent information card is displayed as a small rectangular card. The recent information is reproduced information, the recent information card is displayed as a small rectangular card, and the reproduced source information is displayed. When the recent information card displays a video and a picture, the video and the picture are filled in the display region of the recent information card for display.

In some embodiments, the first client or the server can also determine multiple social network information of the second user account as the recent information. At this moment, the UI displaying the recent information card can also display the switching control. In response to the trigger operation on the switching control, the first client can switch to display different recent information. Or the first client switches to display different recent information according to the sliding operation of the first user account. Or the first client switches to display different recent information according to a refresh operation. The refresh operation can be a slide-down operation (pull-down operation).

In some embodiments, in response to the recent information displayed in the recent information card being a video, the first client can display a sound on/off control in the recent information card. The sound on/off control includes a fixed button, a suspension button, a click/tap hotspot corresponding to text describing a sound on/off function, and the like. The sound on/off control is configured to control on/off of a played sound of the video. For example, when the first client displays the recent information card and the recent information is a video, a picture played by the video is automatically displayed in the recent information card, but the sound of the video is not played. Through a touch operation on the sound on/off control, the first client can play the sound of the video, and stop playing other sounds. When the first client receives the touch operation on the sound on/off control again, the first client may stop playing the sound of the video and resume playing other sounds.

In some embodiments, the outgoing call-interface is a network outgoing call-interface, and a ring icon is displayed in the network outgoing call-interface. In the process of displaying the network outgoing call-interface, the first client may play a calling ringtone, and display a vibration animation of the ring icon following the played calling ringtone in the network outgoing call-interface. The first client can stop playing the calling ringtone and stop displaying the vibration animation of the ring icon in response to a sound playing operation triggered on the sound on/off control. The sound playing operation is used for playing the sound of the video. The vibration animation of the ring icon can prompt the first user account that the calling ringtone is playing at this moment, and playing of the vibration animation of the ring icon is stopped to prompt the first user account that the calling ringtone is no longer playing at this moment.

In some embodiments, the outgoing call-interface includes a phone invitation interface and a video phone invitation interface. The first terminal can also display the foregoing information in the phone invitation interface and the video phone invitation interface. The display method may be similar to that of the first client.

For example, with continued reference to FIG. 2, the recent information control of the first form may be displayed as a rectangular non-transparent recent information card 204, and a folding control 205 displayed below the recent information card 204. The folding control 205 is displayed as a touch hotspot with prompt text. The information posted by the second user account in moments is displayed in the recent information card 204, and specifically includes a picture, text, and a POI. The recent information control of the second form, namely, the unfolding control 206, may be displayed as a fixed button, and prompt text is displayed in the button.

The first client can also display a detailed interface corresponding to the recent information based on the recent information displayed in the recent information card. In some embodiments, the first client can jump to display, in response to a jump operation triggered in the recent information card, the detail interface corresponding to the recent information. The detail interface is an interface corresponding to details of the recent information in the second client. The jump operation can include a touch operation on the recent information displayed in the recent information card, a touch operation on a jump control (such as a button) in the recent information card, and a touch operation on a touch hotspot corresponding to the recent information in the recent information card. The touch hotspot includes a hotspot corresponding to text describing the recent information.

The first client can jump to display, in response to the jump operation and the recent information being information posted in a social circle by the second user account, the detail interface of the recent information in the social circle. The first client can jump to display, in response to the jump operation and the recent information being a short video posted by the second user account, a playing interface of the short video corresponding to the recent information. The first client can jump to display, in response to the jump operation and the recent information being a user status posted by the second user account, an account detail interface displaying the second user account. The user status is displayed in the account detail interface.

Figure 13:
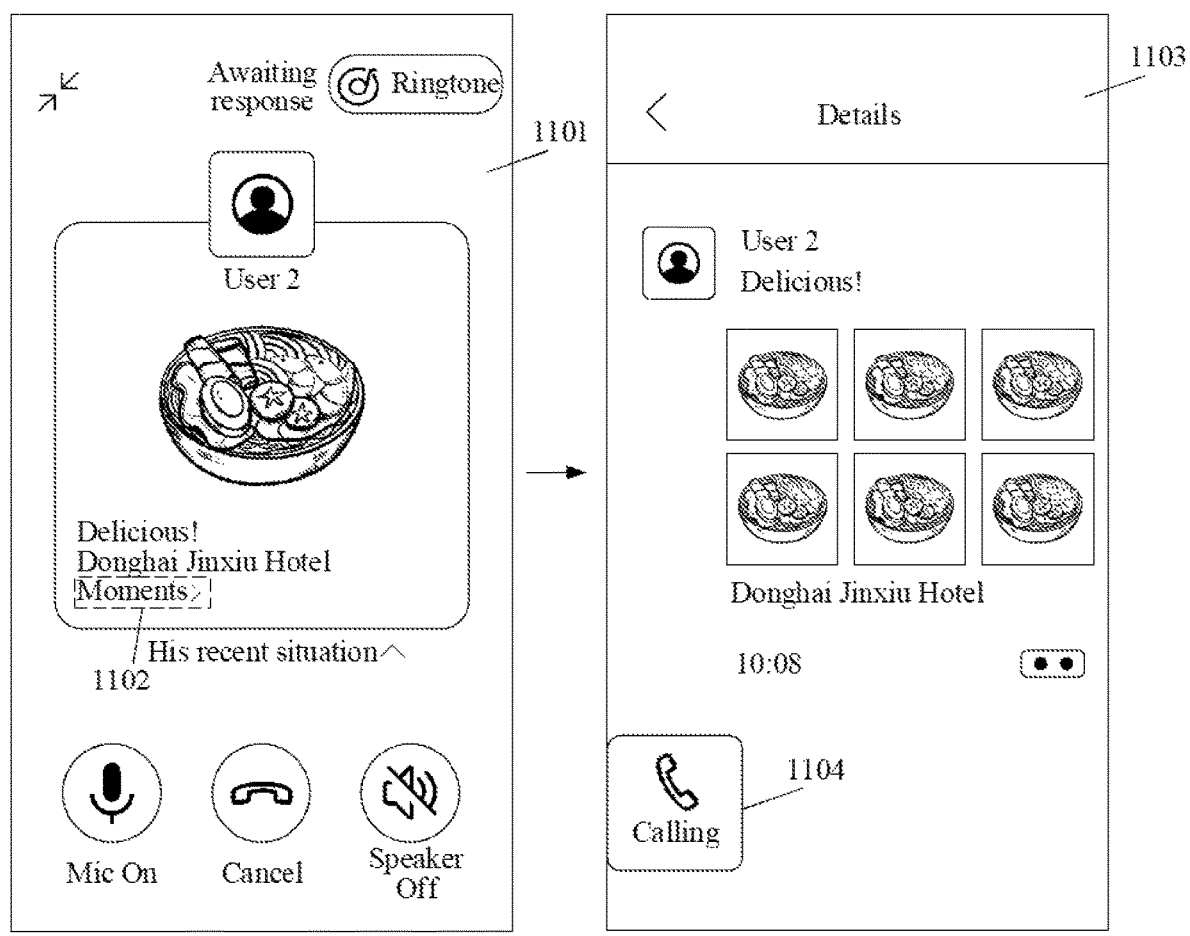
FIG. 13 is a schematic diagram of a detail interface of recent information in a social circle according to one embodiment of this application.

For example, FIG. 13 is a schematic diagram of a detail interface of recent information in a social circle according to one embodiment of this application. As shown in FIG. 13, a voice outgoing call-interface 1101 displays a recent information control of a first form. Recent information displayed in a recent information card is information posted by a second user account in moments, including a photo, text, and a POI. In response to a touch operation on a touch hotspot 1102 for "Moments>", the first client may jump to display a moments detail interface 1103 of the information. The moments detail interface 1103 includes the photo, posting time, POI, and text of the information. And the voice outgoing call-interface 1101 may be zoomed out as a floating layer 1104 in the moments detail interface 1103. The floating layer 1104 can reflect the progress of a voice call. The first client can return to display the voice outgoing call-interface 1101 through a return operation triggered on the floating layer 1104. In some embodiments, after jumping to display the detail interface of the recent information, the first client only plays a ringtone of a network call invitation or a call sound of a network call, and the playing of other contents resumes muting.

Figure 14:
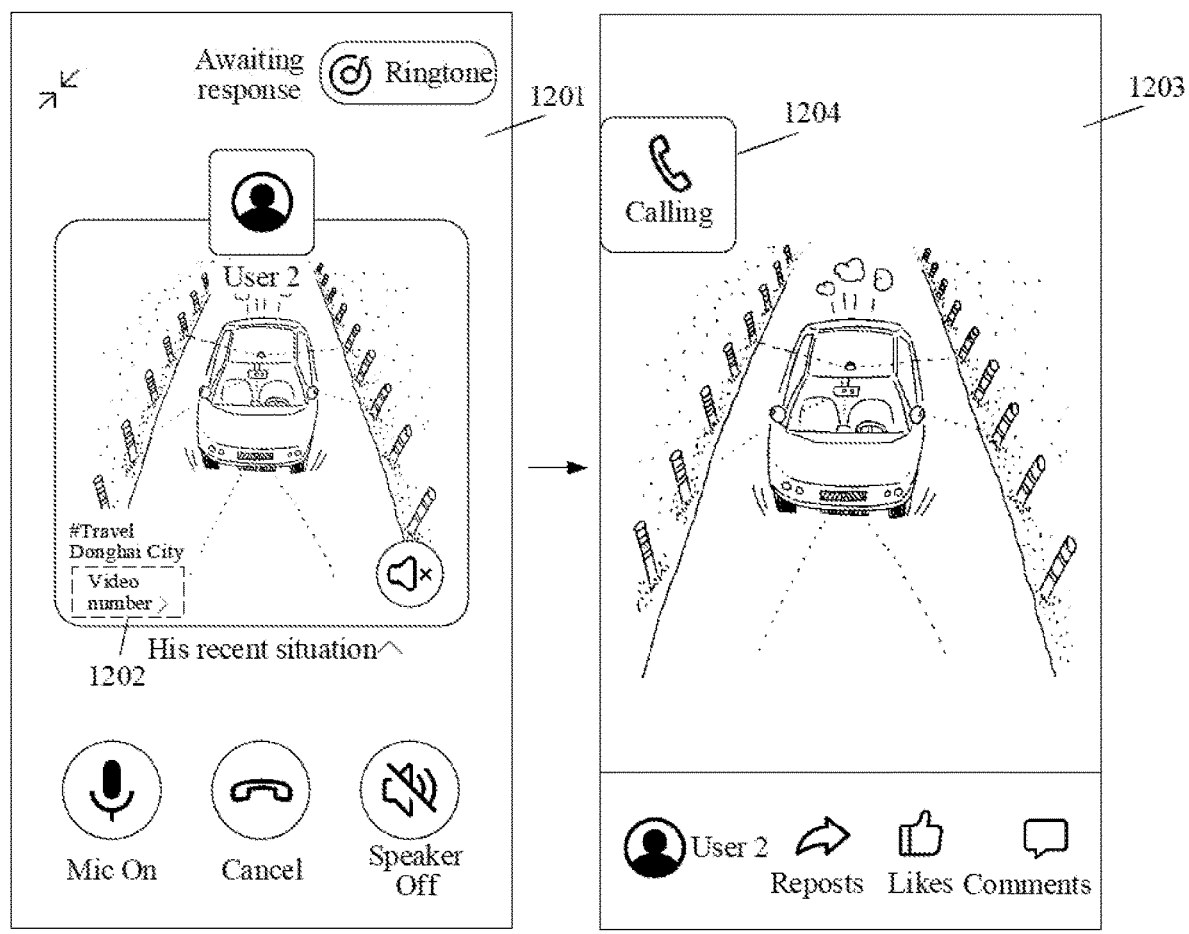
FIG. 14 is a schematic diagram of a playing interface of a short video corresponding to recent information according to one embodiment of this application.

For example, FIG. 14 is a schematic diagram of a playing interface of a short video corresponding to recent information according to one embodiment of this application. As shown in FIG. 14, a voice outgoing call-interface 1201 displays a recent information control of a first form. Recent information displayed in a recent information card is a short video posted by a second user account. When the short video is displayed, the short video may be automatically played. The recent information further includes a tag corresponding to the short video and a POI. In response to a touch operation on a touch hotspot 1202 for "Video number>", the first client may jump to display a short video playing interface 1203 of the information. The short video playing interface 1203 includes a playing picture of the short video, an account name of the second user account, and controls for reposts, likes, and comments on the short video. And the voice outgoing call-interface 1201 may be zoomed out as a floating layer 1204 in the short video playing interface 1203. The floating layer 1204 can reflect the progress of a voice call. The first client can return to display the voice outgoing call-interface 1201 through a return operation triggered on the floating layer 1204.

Figure 15:
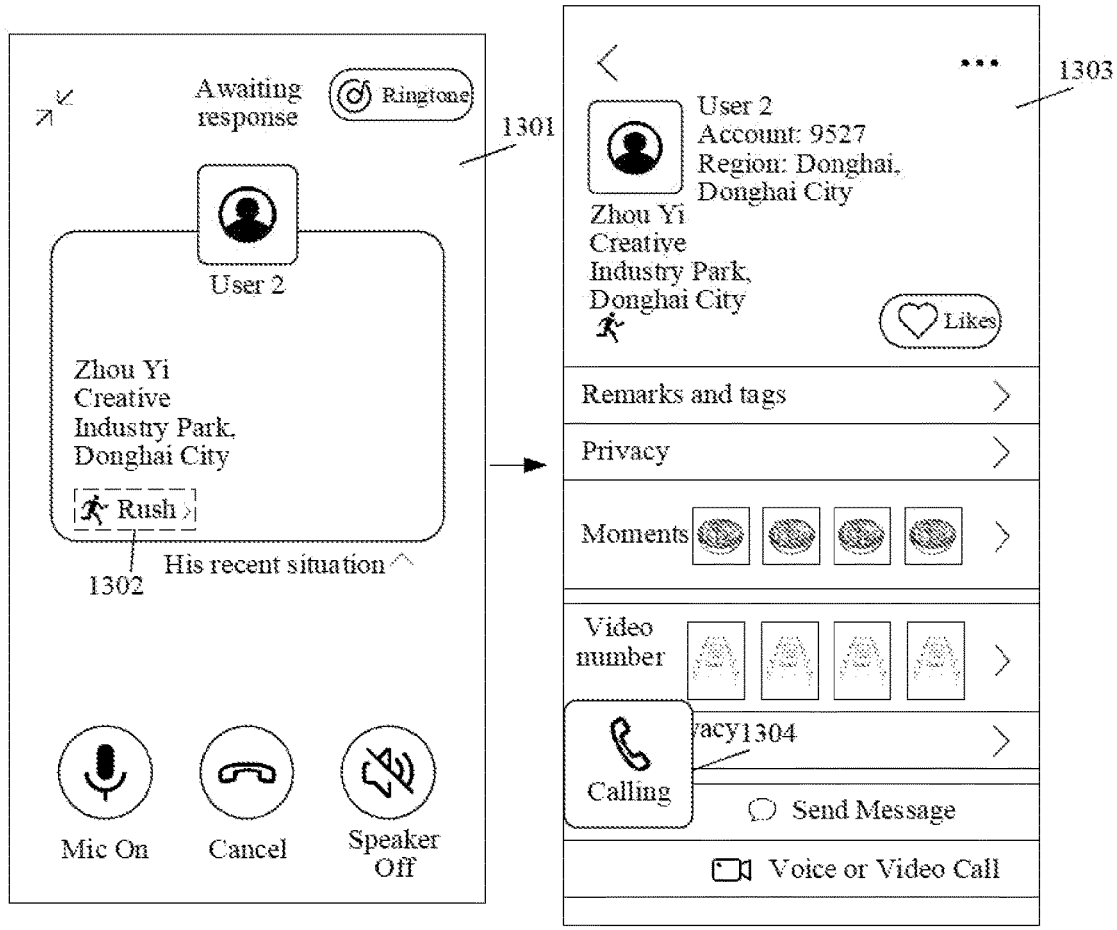
FIG. 15 is a schematic diagram of an account detail interface of a second user account according to one embodiment of this application.

For example, FIG. 15 is a schematic diagram of an account detail interface of a second user account according to one embodiment of this application. As shown in FIG. 15, a voice outgoing call-interface 1301 displays a recent information control of a first form. Recent information displayed in a recent information card is a user status posted by a second user account, including a posting time, a POI, an icon of the status, and a name of the status. In response to a touch operation on a touch hotspot 1302 for "Icon of status and rush", the first client may jump to display an account detail interface 1303 of the second user account. The account detail interface 1303 includes relevant information of the second user account. And the voice outgoing call-interface 1301 may be zoomed out as a floating layer 1304 in the account detail interface 1303. The floating layer 1304 can reflect the progress of a voice call. The first client can return to display the voice outgoing call-interface 1301 through a return operation triggered on the floating layer 1304.

In some embodiments, the network outgoing call-interface includes a voice outgoing call-interface and a video outgoing call-interface. For different types of network outgoing call-interfaces, the first client can display recent information controls of different forms:

(1) Display a recent information control in the voice outgoing call-interface.

The first client can display a recent information control of a first form in the voice outgoing call-interface. That is, when starting to display the voice outgoing call-interface, a recent information card and a folding control are displayed in the voice outgoing call-interface.

(2) Display a recent information control in the video outgoing call-interface.

The first client can display a recent information control of a second form in the video outgoing call-interface. That is, when starting to display the video outgoing call-interface, an unfolding control is displayed in the video outgoing call-interface. Since a display background of the video outgoing call-interface is a video picture of a first user account, the video picture can be prevented from being covered by displaying the unfolding control.

When displaying the recent information control in the voice outgoing call-interface and the video outgoing call-interface, the first client displays the recent information control in the foregoing manner according to default settings. The default settings include a corresponding relationship between the voice outgoing call-interface and the display form of the recent information control, and further include a corresponding relationship between the video outgoing call-interface and the display form of the recent information control. The default settings can determine a form in which the first client displays the recent information control when starting to display different network outgoing call-interfaces. A user can modify the default settings. After the first user account modifies the default settings, the first client can display the recent information control according to the modified settings in different network outgoing call-interfaces. The first client can determine a displayed recent information control form according to default settings through a UI layer and determine a form to be displayed according to an operation of switching the display form.

In some embodiments, when the first terminal displays the recent information control in the phone invitation interface or the video phone invitation interface, the recent information control may be displayed with reference to the manner of displaying the recent information control by the first client in the network outgoing call-interface.

Step 808: Display a call interface in response to the second terminal accepting a call invitation.

That is, the call interface is displayed in response to a call connection.

When the call invitation is a phone invitation or a video phone invitation, the second terminal accepting the call invitation may be regarded as the second user accepting the call invitation. After the second terminal accepts the call invitation from the first terminal, the first terminal may display a phone interface or a video phone interface corresponding to the call invitation.

When the call invitation is a network call invitation, the second terminal accepting the call invitation refers to the second user account accepting the call invitation. When receiving a network call invitation operation, the first client may transmit the network call invitation to the second user account through the server. The network call invitation is determined based on the network call invitation operation. The second client may display the network call invitation. When the second user account receives the network call invitation through the second client, the first client may display a network call interface in which the first user account and the second user account perform a network call.

In some embodiments, the network call interface includes a voice call interface and a video call interface. The type of the displayed network call interface is determined according to the type of the network call invitation.

Step 810: Display or hide the recent information control in the call interface.

The first terminal can display the recent information control of the second form in the call interface, or hide the recent information control in the call interface according to a third form of the recent information control. The first terminal can display the recent information control of the second form in the network call interface through the first client, or hide the recent information control in the network call interface according to the third form of the recent information control. Hiding the recent information control can refer to controlling not to display the recent information control, but display materials for displaying the recent information control also exist in display materials corresponding to the network call interface.

In some embodiments, the network call interface includes a voice call interface and a video call interface. For different types of network call interfaces, the first client can display or hide the recent information control:

(1) Display the recent information control in the voice call interface.

The first client can display the recent information control of the second form in the voice call interface. That is, when the voice call interface starts to be displayed, the unfolding control is displayed in the voice call interface.

(2) Hide the recent information control in the video call interface.

In the video call interface, the first client hides the recent information control according to the third form of the recent information control. That is, in the interface, the first client does not display the recent information of the second user account. The third form of the recent information control, namely the recent information control, is hidden.

When displaying or hiding the recent information control in the voice call interface and the video call interface, the first client displays the recent information control in the foregoing manner according to default settings. The default settings include a corresponding relationship between the voice call interface and the form of the recent information control, and further include a corresponding relationship between the video call interface and the form of the recent information control. The default settings can determine a form in which the first client displays or hides the recent information control when starting to display different network call interfaces. A user can modify the default settings. After the first user account modifies the default settings, the first client can display or hide the recent information control according to the modified settings in different network call interfaces. For example, according to the modified settings, the first client can display the recent information card and the folding control in the video call interface to display the recent information of the second user account in the video call interface.

Figure 16:
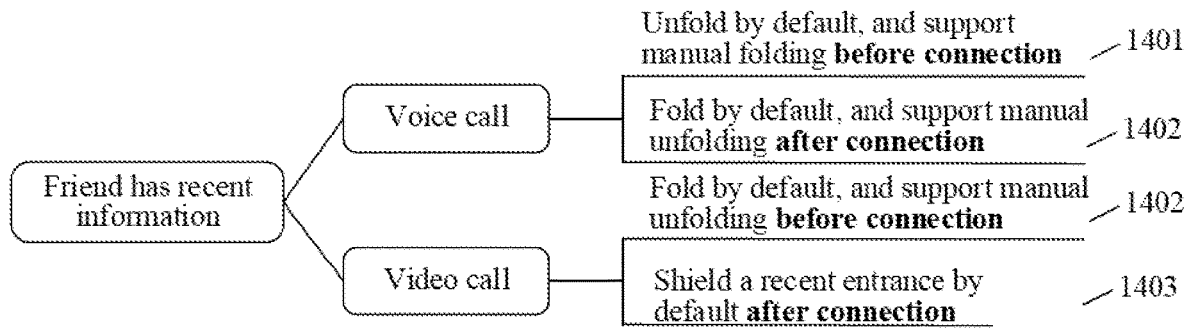
FIG. 16 is a schematic diagram of a corresponding relationship between default settings according to one embodiment of this application.

For example, FIG. 16 is a schematic diagram of a corresponding relationship between default settings according to one embodiment of this application. As shown in FIG. 16, under default settings, when the second user account has recent information. In a voice call scene, before a voice call is connected, the first client may display a recent information control 1401 of a first form, namely, display a recent information card, and the recent information card is foldable. After the voice call is connected, the first client may display a recent information control 1402 of a second form, namely, display an unfolding control, and the recent information card may be unfolded and displayed through the unfolding control. In a video call scene, before a video call is connected, the first client may display the recent information control 1402 of the second form, namely, display the unfolding control, and the recent information card may be unfolded and displayed through the unfolding control. After the video call is connected, the first client may hide the recent information card according to a third form 1403.

Figure 17:
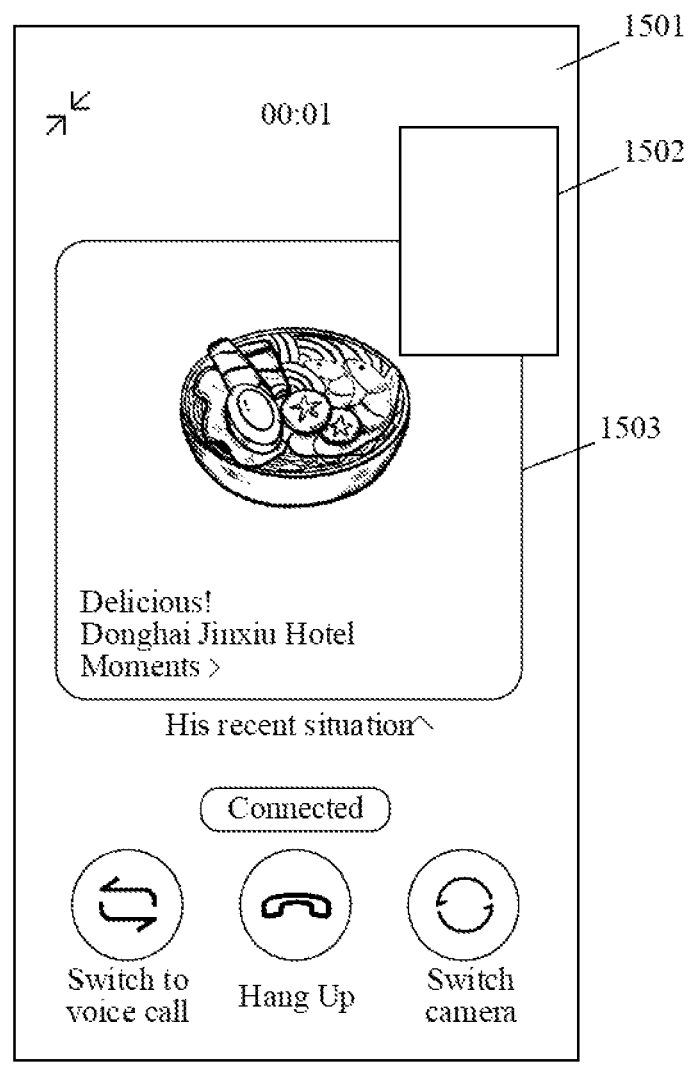
FIG. 17 is a schematic diagram of a video call interface according to one embodiment of this application.

In some embodiments, according to the modified settings, the first client can also display the recent information card and the folding control in the video call interface to display the recent information of the second user account in the video call interface. For example, FIG. 17 is a schematic diagram of a video call interface according to one embodiment of this application. As shown in FIG. 17, a video picture floating layer 1502 is displayed in a video call interface 1501. A display background of the video call interface 1501 is a video picture of the first user account. A video picture of the second user account is displayed in the video picture floating layer 1502. Or the display background of the video call interface 1501 is the video picture of the second user account, the video picture of the first user account is displayed in the video picture floating layer 1502, and the video pictures can be switched. When displaying a recent information control 1503 of a first form, the first client may display the recent information control on a lower layer of the video picture floating layer 1502. In some embodiments, the recent information control 1503 of the first form can be dragged and zoomed. The recent information control 1503 of the first form is displayed transparently, and the transparency is preset or set by the first user account.

In some embodiments, the first client may hide the sound on/off control hidden in the recent information card in response to the recent information card being displayed in the network call interface and the recent information displayed in the recent information card being a video. The network call interface is an interface displayed after the second user account accepts the network call invitation, and the network call invitation is determined based on the network call invitation operation.

Figure 18:
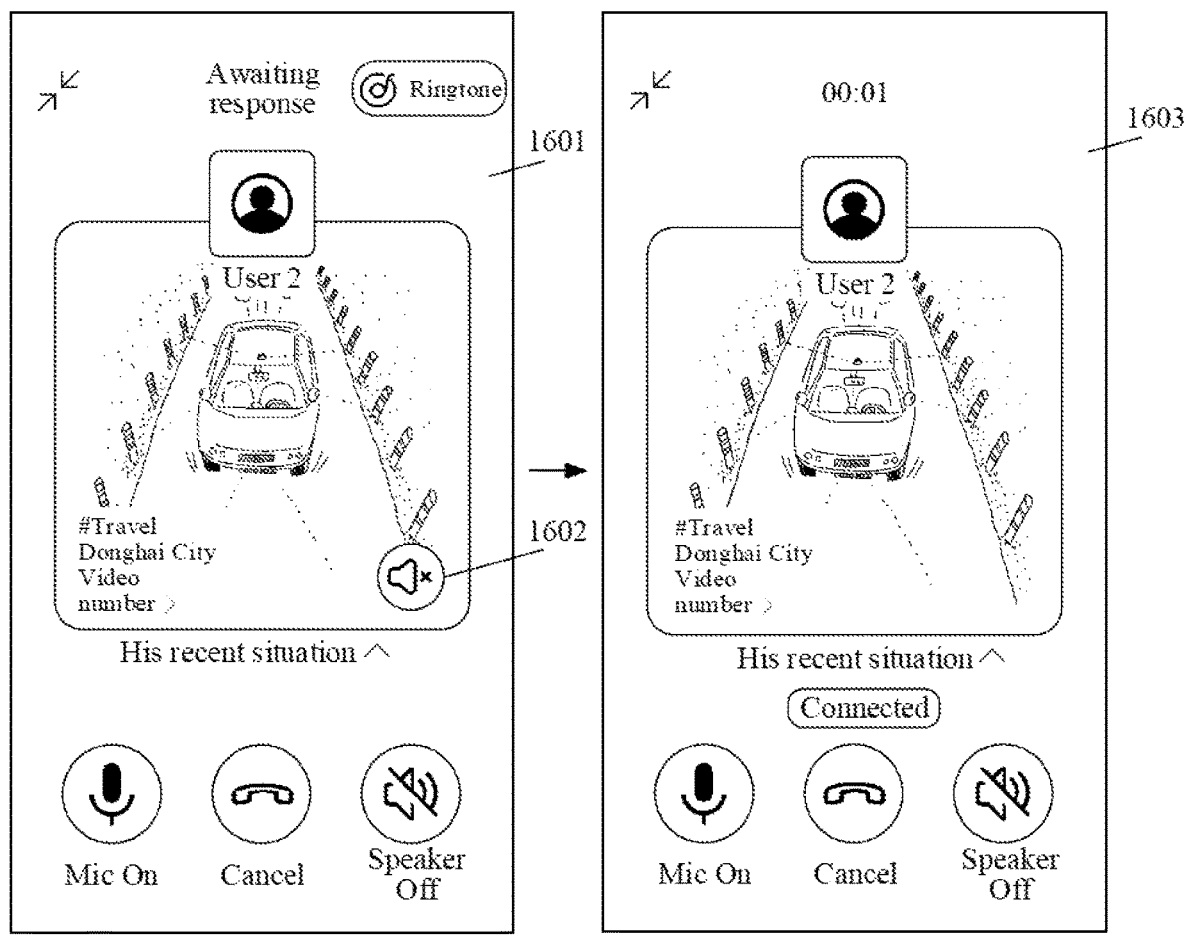
FIG. 18 is a schematic diagram of a network call interface according to one embodiment of this application.

For example, FIG. 18 is a schematic diagram of a network call interface according to one embodiment of this application. A recent information card is displayed in a voice outgoing call-interface 1601. Recent information displayed in the recent information card is a video. At this moment, the first client may display a sound on/off control 1602 in the recent information card. After the second user account accepts the voice call invitation, the first client may display a voice call interface 1603. When the foregoing video is displayed through the recent information card in the voice call interface 1603, the sound on/off control 1602 is hidden.

In some embodiments, when the second user account receives the network call invitation transmitted by the first user account, the second client may display a network call invited interface. The network call invited interface can display the recent information of the first user account. The network call invited interface is used for prompting the second user account that the first user account has transmitted the network call invitation thereto. When the second user account accepts the network call invitation, the second client can also display the network call interface between the second user account and the first user account, and hide or display the recent information of the first user account on the network call interface.

The method of obtaining the recent information of the first user account by the second client may be similar to the method of obtaining the recent information of the second user account by the first client. The method of displaying the recent information of the first user account by the second client in the network call invited interface may be similar to the method of displaying the recent information of the second user account by the first client in the network outgoing call-interface. The method of displaying or hiding the recent information of the first user account by the second client in the network call interface may be similar to the method of displaying or hiding the recent information of the second user account by the first client in the network call interface.

Figure 19:
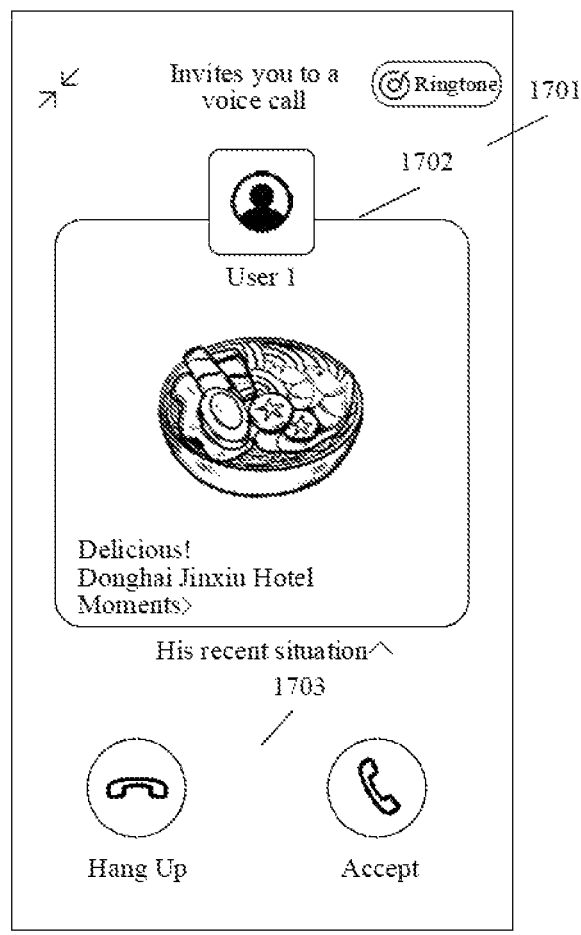
FIG. 19 is a schematic diagram of a voice call invited interface according to one embodiment of this application.

For example, FIG. 19 is a schematic diagram of a voice call invited interface according to one embodiment of this application. As shown in FIG. 19, after receiving the voice call invitation transmitted by the first client, the second client may display a voice call invited interface 1701. The voice call invited interface 1701 may display a recent information control 1702 of a first form according to default settings, and display the recent information of the first user account in the recent information card. The voice call invited interface 1701 also displays a call control 1703 including a reject control for rejecting the voice call invitation and an answer control for accepting the voice call invitation. The second client can also modify the foregoing default settings according to the configuration operation of the second user account.

In some embodiments, when the first terminal displays or hides the recent information control in the phone interface or the video phone interface, the information control may be displayed or hidden with reference to the foregoing manner of displaying or hiding the recent information control by the first client in the network call interface.

In summary, according to the method provided in this embodiment, after a first user initiates a call invitation to a second user, recent information of the second user can be displayed in an outgoing call-interface. The second user is a user to whom the first user desires to initiate a call, and the displayed recent information of the second user helps the first user to know the recent situation of the second user and facilitates chatting between the two users. In this process, the first user is not required to perform an operation, thereby avoiding the problem that the operation of information access is cumbersome.

The method provided in this embodiment also achieves avoiding covering other contents displayed in a UI while displaying recent information by displaying recent information controls of different forms.

The method provided in this embodiment also enables the display of recent information in a second form by displaying a recent information control by unfolding from the second form to a first form.

The method provided in this embodiment also enables direct display of recent information in a voice outgoing call-interface by making full use of the characteristic that there is content not displayed in the voice outgoing call-interface by displaying the recent information control of the first form in the voice outgoing call-interface.

The method provided in this embodiment also avoids covering a video picture of a first user account displayed in a video outgoing call-interface by displaying the recent information control of the second form in the video outgoing call-interface.

The method provided in this embodiment also enables the flexible switching of the size of the recent information control by displaying the recent information control by folding from the first form to the second form, and enables avoiding covering the content displayed in the UI while providing the display of the recent information.

The method provided in this embodiment also enables display of the recent information during a call between a first user and a second user by displaying or hiding the recent information in the call interface.

The method provided in this embodiment also avoids the interference of the displayed information on the user during the chatting process by displaying the recent information control of the second form in the voice call interface.

The method provided in this embodiment also avoids the problem of poor user experience caused by covering the video picture of the second user account by hiding the recent information control in the video call interface.

The method provided in this embodiment also determines recent information through multiple sources of recent information, whereby the first user can learn about the recent situation of the second user in different dimensions.

The method provided in this embodiment also enables the user to quickly view details of the recent information by providing a function of jumping to display a detail interface corresponding to the recent information, thereby improving the efficiency of information access.

The method provided in this embodiment also improves the user experience by jumping to detail interfaces corresponding to different types of recent information for the different types of recent information.

The method provided in this embodiment also enables the user to freely control the sound of a video played by a recent information card by providing a sound on/off control in the recent information card to enhance the user experience.

The method provided in this embodiment can also accurately reflect whether a calling ringtone is currently being played through a ringtone icon by stopping displaying a vibration animation of the ringtone icon when the video sound is played.

The method provided in this embodiment also prevents the sound played by the video in the recent information card from affecting the call of the user by hiding the sound on/off control in the network call interface.

The method provided in this embodiment can prevent the first user from having access to recent information without an access permission by determining the recent information according to the access permission of the first user, thereby ensuring the privacy of the second user.

The method provided in this embodiment also enables flexible determination of the recent information by determining the recent information from social network information in different manners to meet the requirements of different scenes.

The method provided in this embodiment also prevents the first user account from having access to repeated recent information by refreshing the recent information during the next network call.

The order of the method steps provided in the embodiments of this application may be suitably adjusted, and the steps may also be correspondingly increased or decreased according to circumstances. Any person skilled in the art would have readily conceived of a change within the technical scope disclosed in this application, which is within the protection scope of this application and thus will not be described in detail.

Figure 20:
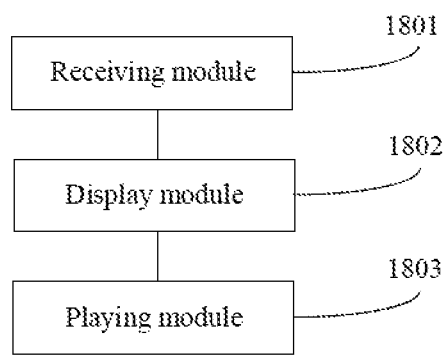
FIG. 20 is a schematic structural diagram of a call display apparatus according to one embodiment of this application.

FIG. 20 is a schematic structural diagram of a call display apparatus according to one embodiment of this application. As shown in FIG. 20, the apparatus includes:

a display module 1802, configured to display a outgoing call-interface, the outgoing call-interface being a waiting interface prior to a call connection between the first terminal and a second terminal.

The display module 1802 is further configured to display recent information corresponding to the second terminal in the outgoing call-interface. The recent information belongs to social network information recently posted by a second user account corresponding to the second terminal.

In one embodiment, the display module 1802 is configured to:

display a recent information control of a first form in the outgoing call-interface, the recent information control of the first form being displayed as a recent information card, and the recent information being displayed in the recent information card;

or display a recent information control of a second form in the outgoing call-interface, the recent information control of the second form being displayed as an unfolding control.

In one embodiment, the display module 1802 is configured to:

display, in response to an unfolding operation triggered on the unfolding control, the recent information control by unfolding from the second form to the first form.

In one embodiment, a call invitation operation includes a network call invitation operation. The network call invitation operation includes a voice call invitation operation. The display module 1802 is configured to:

display a voice outgoing call-interface in response to the voice call invitation operation; and display the recent information control of the first form in the voice outgoing call-interface.

In one embodiment, the call invitation operation includes a network call invitation operation. The network call invitation operation includes a video call invitation operation. The display module 1802 is configured to:

display a video outgoing call-interface in response to the video call invitation operation; and display the recent information control of the second form in the video outgoing call-interface.

In one embodiment, the display module 1802 is configured to:

display a folding control in the outgoing call-interface displaying the recent information card; and display, in response to a folding operation triggered on the folding control, the recent information control by folding from the first form to the second form.

In one embodiment, the display module 1802 is configured to:

display a call interface in response to a call connection; display the recent information control of the second form in the call interface; or hide the recent information control in a network call interface according to a third form of the recent information control.

In one embodiment, a call invitation includes a network call invitation. The network call invitation includes a voice call invitation. The display module 1802 is configured to:

display a voice call interface in response to the second user account accepting the voice call invitation; and display the recent information control of the second form in the voice call interface.

In one embodiment, the call invitation includes a network call invitation. The network call invitation includes a video call invitation. The display module 1802 is configured to:

display a video call interface in response to the second user account accepting the video call invitation; and hide the recent information control in the video outgoing call-interface according to a third form of the recent information control.

In one embodiment, the recent information includes at least one of the following information:

information posted by the second user account in a social circle; a short video posted by the second user account; a user status posted by the second user account; a user signature posted by the second user account; a message posted by the second user account; a shared album posted by the second user account; or a geographical location posted by the second user account. In one embodiment, the display module 1802 is configured to:

jump to display, in response to a jump operation triggered in the recent information card, a detail interface corresponding to the recent information.

In one embodiment, the display module 1802 is configured to: jump to display, in response to the jump operation and the recent information being information posted in a social circle by the second user account, the detail interface of the recent information in the social circle; jump to display, in response to the jump operation and the recent information being a short video posted by the second user account, a playing interface of the short video corresponding to the recent information; and jump to display, in response to the jump operation and the recent information being a user status posted by the second user account, an account detail interface displaying the second user account, the user status being displayed in the account detail interface.

In one embodiment, the display module 1802 is configured to: display a sound on/off control in the recent information card in response to the recent information displayed in the recent information card being a video, the sound on/off control being configured to control on/off of a played sound of the video.

In one embodiment, a ring icon is displayed in the outgoing call-interface. The apparatus further includes:

a playing module 1803, configured to play a calling ringtone in the process of displaying the outgoing call-interface. The display module 1802 is configured to display a vibration animation of the ring icon following the played calling ringtone in the outgoing call-interface.

The playing module 1803 is further configured to stop playing the calling ringtone in response to a sound playing operation triggered on the sound on/off control. The sound playing operation is used for playing the sound of the video. The display module 1802 is further configured to stop displaying the vibration animation of the ring icon.

In one embodiment, the display module 1802 is configured to:

display the sound on/off control in a hidden manner in response to the recent information card being displayed in the network call interface and the recent information displayed in the recent information card being a video. The call interface is an interface displayed after a call connection.

In one embodiment, the recent information is information about a first user account having an access permission in the social network information posted by the second user account. The first user account is a user account corresponding to the first terminal.

In one embodiment, the recent information is social network information posted closest to a current time in the social network information posted by the second user account within the latest time period.

Or, the recent information is social network information which is posted closest to the current time and has not been accessed by the first user account in the social network information posted by the second user account within the latest time period.

Or the recent information is social network information last posted by the second user account.

In one embodiment, the display module 1802 is configured to:

display refreshed recent information in the network outgoing call-interface in response to displaying the outgoing call-interface again, the refreshed recent information being different from the recent information not refreshed.

The refreshed recent information includes any one of the following:

social network information recently posted by the second user account between the last two network call invitation operations;

the last social network information posted by the second user account before the recent information not refreshed; or the last social network information which is posted by the second user account before the recent information not refreshed and is not accessed by the first user account.

In one embodiment, the apparatus further includes: a receiving module 1801, configured to receive a call invitation operation initiated by the first terminal to the second terminal, and display the outgoing call-interface in response to the call invitation operation.

Or the display module 1802 is configured to display the outgoing call-interface in response to the second terminal initiating a call invitation to the first terminal.

The call display apparatus provided in the foregoing embodiments is illustrated with an example of division of the foregoing function modules. In practical application, the foregoing functions may be allocated to and completed by different function modules according to requirements. That is, the internal structure of the device is divided into different function modules, to complete all or part of the functions described above. In addition, the call display apparatus provided in the foregoing embodiments and the call display method embodiments fall within the same conception. A specific implementation process is described in detail with reference to the method embodiments and will not be repeated herein.

Embodiments of this application also provide a computer device. The computer device includes: a processor and a memory. The memory stores at least one instruction, at least one program, a code set, or an instruction set. The at least one instruction, the at least one program, the code set, or the instruction set is loaded and executed by the processor to implement the call display method provided in the foregoing method embodiments.

Figure 21:
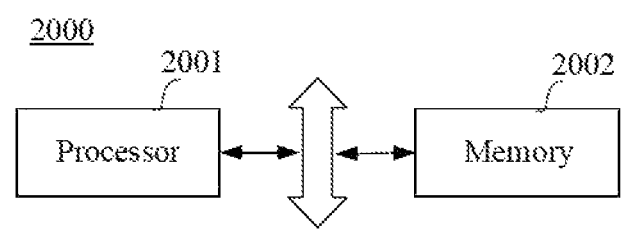
FIG. 21 is a schematic structural diagram of a terminal according to one embodiment of this application.

In some embodiments, the computer device is a terminal. For example, FIG. 21 is a schematic structural diagram of a terminal according to one embodiment of this application.

The terminal 2000 includes: a processor 2001 and a memory 2002.

The processor 2001 may include one or more processing cores, for example, a 4-core processor or an 8-core processor. The processor 2001 may be implemented in at least one hardware form of a digital signal processor (DSP), a field-programmable gate array (FPGA), and a programmable logic array (PLA). The processor 2001 may further include a main processor and a co-processor. The main processor is a processor for processing data in a wake-up status, and is also referred to as a central processing unit (CPU). The co-processor is a low-power processor for processing data in a standby status. In some embodiments, the processor 2001 may be integrated with a graphics processing unit (GPU). The GPU is responsible for rendering and drawing content to be displayed by a display screen. In some embodiments, the processor 2001 may further include an artificial intelligence (AI) processor. The AI processor is configured to process computing operations related to machine learning.

The memory 2002 may include one or more computer-readable storage media. The computer-readable storage medium may be non-transient. The memory 2002 may further include a high-speed random access memory and a nonvolatile memory, for example, one or more disk storage devices or flash storage devices. In some embodiments, the non-transitory computer-readable storage medium in the memory 2002 is configured to store at least one instruction. At least one instruction is used for execution by the processor 2001 to implement the call display method according to the method embodiments of this application.

It is to be understood by a person skilled in the art that the structure shown in FIG. 22 is not limiting of the terminal 2000 and may include more or fewer assemblies than illustrated, or some assemblies may be combined, or different assembly arrangements may be employed.

Embodiments of this application also provide a computer-readable storage medium. The computer-readable storage medium stores at least one program code. The program code, when loaded and executed by a processor of a computer device, implements the call display method according to the foregoing method embodiments.

This application also provides a computer program product or computer program. The computer program product or computer program includes computer instructions. The computer instructions are stored in a computer-readable storage medium. A processor of a computer device reads the computer instructions from the computer-readable storage medium. The processor executes the computer instructions, whereby the computer device performs the call display method according to the foregoing embodiments of this application.

A person of ordinary skill in the art may appreciate that all or part of the steps for implementing the foregoing embodiments may be completed by hardware as well as by programming associated hardware. The program may be stored in a computer-readable storage medium. The above-mentioned readable storage medium may be a read-only memory, a magnetic disk, or an optical disk.

The foregoing descriptions are merely optional embodiments of this application, but are not intended to limit this application. Any modification, equivalent switching, or improvement made within the spirit and principle of this application shall fall within the protection scope of this application.

What is claimed is:

1. A call display method, applied to a first terminal, the method comprising:
   displaying an outgoing call-interface corresponding to a first user account, the outgoing call-interface being prior to a call connection between the first terminal and a second terminal;
   determining, while waiting for the call connection to be established, from a plurality of pieces of social network information recently posted by a second user account corresponding to the second terminal, recent information not accessed by the first user account within a preset period of time, wherein the preset period of time is set by the first user account or the second user account and traced to a current time of the first user account for a present duration; and
   displaying the recent information in the outgoing call-interface, wherein the recent information includes a touch hotspot, and the method further includes:
      folding the outgoing call-interface as a floating layer in the first terminal; and
      displaying, in response to a touch operation on the touch hotspot, moments information via a moments detail interface, the moments information including a plurality of moments details for presenting the recent information.

2. The method according to claim 1, wherein the displaying the recent information corresponding to the second terminal in the outgoing call-interface comprises:
   displaying a recent information control of a first form in the outgoing call-interface, the recent information control of the first form being displayed as a recent information card, and the recent information being displayed in the recent information card;
   or, displaying a recent information control of a second form in the outgoing call-interface, the recent information control of the second form being displayed as an unfolding control.

3. The method according to claim 2, further comprising:
   displaying the recent information control by unfolding from the second form to the first form in response to an unfolding operation triggered on the unfolding control.

4. The method according to claim 2, wherein the recent information control is displayed as the first form when the outgoing call-interface is a voice outgoing call-interface.

5. The method according to claim 2, wherein the recent information control is displayed as the second form when the outgoing call-interface is a video outgoing call-interface.

6. The method according to claim 2, further comprising:
displaying a folding control in the outgoing call-interface displaying the recent information card; and
displaying the recent information control by folding from the first form to the second form in response to a folding operation triggered on the folding control.

7. The method according to claim 2, further comprising:
displaying a call interface in response to a call connection;
displaying the recent information control of the second form in the call interface; or, hiding the recent information control in the call interface according to a third form of the recent information control.

8. The method according to claim 7, wherein the call interface comprises a voice call interface;
the displaying the recent information control of the second form in the call interface comprises:
displaying the recent information control of the second form in the voice call interface.

9. The method according to claim 7, wherein the call interface comprises a video call interface;
the hiding the recent information control in the call interface according to a third form of the recent information control comprises:
hiding the recent information control in the video call interface according to a third form of the recent information control.

10. The method according to claim 2, further comprising:
jumping to display, in response to a jump operation triggered in the recent information card, a detail interface corresponding to the recent information.

11. The method according to claim 10, wherein the jumping to display, in response to a jump operation triggered in the recent information card, a detail interface corresponding to the recent information comprises:
jumping to display, in response to the jump operation and the recent information being information posted in a social circle by the second user account, the detail interface of the recent information in the social circle;
jumping to display, in response to the jump operation and the recent information being a short video posted by the second user account, a playing interface of the short video corresponding to the recent information; and
jumping to display, in response to the jump operation and the recent information being a user status posted by the second user account, an account detail interface displaying the second user account, the user status being displayed in the account detail interface.

12. The method according to claim 2, further comprising:
displaying a sound on/off control in the recent information card in response to the recent information displayed in the recent information card being a video, the sound on/off control being configured to control on/off of a played sound of the video.

13. The method according to claim 1, wherein the recent information comprises at least one of the following information:
information posted by the second user account in a social circle;
a short video posted by the second user account;
a user status posted by the second user account;
a user signature posted by the second user account;
a message posted by the second user account;
a shared album posted by the second user account; or
a geographical location posted by the second user account.

14. The method according to claim 1, wherein
the recent information is information about a first user account having an access permission in the social network information posted by the second user account, the first user account being a user account corresponding to the first terminal.

15. The method according to claim 1, wherein
the recent information further includes social network information posted most recently by the second user account;
or, the recent information further includes social network information last posted by the second user account.

16. The method according to claim 1, further comprising:
displaying refreshed recent information in the outgoing call-interface in response to displaying the outgoing call-interface again, the refreshed recent information being different from the recent information not refreshed,
the refreshed recent information comprising any one of the following:
social network information recently posted by the second user account between the last two call invitation operations;
the last social network information posted by the second user account before the recent information being refreshed; or
the last social network information which is posted by the second user account before the recent information being refreshed and not being accessed by the first user account.

17. A computer device, comprising a processor and a memory,
the memory storing at least one instruction, at least one program, a code set, or an instruction set, the at least one instruction, the at least one program, the code set, or the instruction set being loaded and executed by the processor to implement:
displaying an outgoing call-interface corresponding to a first user account, the outgoing call-interface being prior to a call connection between the first terminal and a second terminal;
determining, while waiting for the call connection to be established, from a plurality of pieces of social network information recently posted by a second user account corresponding to the second terminal, recent information not accessed by the first user account within a preset period of time, wherein the preset period of time is set by the first user account or the second user account and traced to a current time of the first user account for a present duration; and
displaying recent information in the outgoing call-interface, wherein the recent information includes a touch hotspot, and the processor is further configured to implement:
folding the outgoing call-interface as a floating layer in the first terminal; and
displaying, in response to a touch operation on the touch hotspot, moments information via a moments detail interface, the moments information including a plurality of moments details for presenting the recent information.

18. A non-transitory computer-readable storage medium, storing at least one instruction, at least one program, a code set, or an instruction set, the at least one instruction, the at least one program, the code set, or the instruction set being loaded and executed by a processor to implement:

displaying an outgoing call-interface corresponding to a first user account, the outgoing call-interface being prior to a call connection between the first terminal and a second terminal;

determining, while waiting for the call connection to be established, from a plurality of pieces of social network information recently posted by a second user account corresponding to the second terminal, recent information not accessed by the first user account within a preset period of time, wherein the preset period of time is set by the first user account or the second user account and traced to a current time of the first user account for a present duration; and displaying recent information in the outgoing call-interface, wherein the recent information includes a touch hotspot, and the at least one instruction, the at least one program, the code set, or the instruction set further causes the processor to implement:

folding the outgoing call-interface as a floating layer in the first terminal; and displaying, in response to a touch operation on the touch hotspot, moments information via a moments detail interface, the moments information including a plurality of moments details for presenting the recent information.

19. The method according to claim 1, wherein the plurality of moments details include details in forms of photographs, points of interest (POI), text, or combination thereof.

\* \* \* \* \*